(12) United States Patent
Green et al.

(10) Patent No.: US 8,323,784 B2
(45) Date of Patent: Dec. 4, 2012

(54) TRANSPARENT ELECTRICAL CONDUCTORS PREPARED FROM SORTED CARBON NANOTUBES AND METHODS OF PREPARING SAME

(75) Inventors: Alexander A. Green, Evanston, IL (US); Mark C. Hersam, Evanston, IL (US)

(73) Assignee: Northwestern Universtiy, Evanston, IL (US)

( * ) Notice: Subject to any disclaimer, the term of this patent is extended or adjusted under 35 U.S.C. 154(b) by 884 days.

(21) Appl. No.: 12/229,595

(22) Filed: Aug. 25, 2008

(65) Prior Publication Data

US 2009/0061194 A1 Mar. 5, 2009

Related U.S. Application Data

(60) Provisional application No. 60/966,592, filed on Aug. 29, 2007.

(51) Int. Cl.
*B32B 7/02* (2006.01)

(52) U.S. Cl. ........................................ 428/220; 428/336

(58) Field of Classification Search ................... 428/220, 428/336, 439
See application file for complete search history.

(56) References Cited

U.S. PATENT DOCUMENTS

| | | |
|---|---|---|
| 6,183,714 B1 | 2/2001 | Smalley et al. |
| 6,232,706 B1 | 5/2001 | Dai et al. |
| 6,265,466 B1 | 7/2001 | Glatkowski et al. |
| 6,591,658 B1 | 7/2003 | Yedur et al. |
| 6,669,918 B2 | 12/2003 | Schleier-Smith et al. |
| 6,683,783 B1 | 1/2004 | Smalley et al. |
| 6,706,566 B2 | 3/2004 | Avouris et al. |
| 6,749,826 B2 | 6/2004 | Tillotson et al. |
| 6,749,827 B2 | 6/2004 | Smalley et al. |
| 6,756,025 B2 | 6/2004 | Colbert et al. |
| 6,756,026 B2 | 6/2004 | Colbert et al. |
| 6,762,237 B2 | 7/2004 | Glatkowski et al. |
| 6,824,755 B2 | 11/2004 | Colbert et al. |
| 6,902,815 B2 * | 6/2005 | Kashiwabara et al. ....... 428/434 |
| 6,905,667 B1 | 6/2005 | Chen et al. |
| 6,936,233 B2 | 8/2005 | Smalley et al. |
| 6,936,322 B2 | 8/2005 | Sakakibara et al. |
| 6,939,525 B2 | 9/2005 | Colbert et al. |
| 6,949,237 B2 | 9/2005 | Smalley et al. |
| 6,969,504 B2 | 11/2005 | Smalley et al. |
| 6,974,927 B2 | 12/2005 | Hannah |
| 6,979,709 B2 | 12/2005 | Smalley et al. |
| 6,986,853 B2 | 1/2006 | Glatkowski et al. |
| 6,986,876 B2 | 1/2006 | Smalley et al. |
| 6,988,925 B2 | 1/2006 | Arthur et al. |
| 7,008,604 B2 | 3/2006 | Smalley et al. |
| 7,038,299 B2 | 5/2006 | Furukawa et al. |
| 7,041,620 B2 | 5/2006 | Smalley et al. |
| 7,048,903 B2 | 5/2006 | Colbert et al. |
| 7,048,999 B2 | 5/2006 | Smalley et al. |
| 7,052,666 B2 | 5/2006 | Colbert et al. |
| 7,060,241 B2 | 6/2006 | Glatkowski |
| 7,067,098 B2 | 6/2006 | Colbert et al. |
| 7,070,754 B2 | 7/2006 | Smalley et al. |
| 7,071,406 B2 | 7/2006 | Smalley et al. |
| 7,074,310 B2 | 7/2006 | Smalley et al. |
| 7,074,379 B2 | 7/2006 | Moy et al. |
| 7,087,207 B2 | 8/2006 | Smalley et al. |
| 7,097,820 B2 | 8/2006 | Colbert et al. |
| 7,098,151 B2 | 8/2006 | Moriya et al. |
| 7,105,596 B2 | 9/2006 | Smalley et al. |
| 7,108,841 B2 | 9/2006 | Smalley et al. |
| 7,115,864 B2 | 10/2006 | Colbert et al. |
| 7,118,693 B2 | 10/2006 | Glatkowski et al. |
| 7,131,537 B2 * | 11/2006 | Papadimitrakopoulos ..... 209/18 |
| 7,166,266 B2 | 1/2007 | Nikolaev et al. |
| 7,188,953 B2 | 3/2007 | Silverstein et al. |
| 7,195,754 B1 | 3/2007 | Glatkowski et al. |
| 7,198,373 B2 | 4/2007 | Silverstein et al. |
| 7,205,069 B2 | 4/2007 | Smalley et al. |
| 7,211,364 B1 | 5/2007 | Landry-Coltrain et al. |
| 7,247,670 B2 | 7/2007 | Malenfant et al. |
| 7,261,852 B2 | 8/2007 | Rinzler et al. |
| 7,294,372 B2 | 11/2007 | Cok |
| 7,338,915 B1 | 3/2008 | Smalley et al. |
| 7,342,479 B2 | 3/2008 | Glatkowski et al. |
| 7,354,563 B2 | 4/2008 | Smalley et al. |
| 7,357,906 B2 | 4/2008 | Colbert et al. |

(Continued)

FOREIGN PATENT DOCUMENTS

JP 08-231210 9/1996

(Continued)

OTHER PUBLICATIONS

Ma et al., "Directly Synthesized Strong, Highly Conducting, Transparent Single-Walled Carbon Nanotubes Films," *Nano Letters*, 7(8):2307-2311 (2007).

(Continued)

*Primary Examiner* — Maria Veronica Ewald
*Assistant Examiner* — Lawrence Ferguson
(74) *Attorney, Agent, or Firm* — Reinhart Boerner Van Deuren s.c.

(57) ABSTRACT

Various methods related to the preparation of transparent electrical conductors based on carbon nanotubes having enhanced optical and electrical properties are disclosed. In some embodiments, the methods involve employing carbon nanotubes that have been presorted according to electronic type and/or optical absorbance for use in transparent electrical conductors. Other embodiments involve use of carbon nanotube bundles that have been pre-sorted according to bundle density.

20 Claims, 11 Drawing Sheets
(3 of 11 Drawing Sheet(s) Filed in Color)

U.S. PATENT DOCUMENTS

| | | | |
|---|---|---|---|
| 7,374,685 B2 | 5/2008 | Sun | |
| 7,390,477 B2 | 6/2008 | Smalley et al. | |
| 7,390,767 B2 | 6/2008 | Smalley et al. | |
| 7,419,624 B1 | 9/2008 | Smalley et al. | |
| 7,419,651 B2 | 9/2008 | Smalley et al. | |
| 7,458,687 B2 | 12/2008 | Silverstein et al. | |
| 7,481,989 B2 | 1/2009 | Smalley et al. | |
| 7,510,695 B2 | 3/2009 | Smalley et al. | |
| 7,666,939 B2 * | 2/2010 | Wise et al. | 524/495 |
| 2001/0050219 A1 | 12/2001 | Anazawa et al. | |
| 2002/0035170 A1 | 3/2002 | Glatkowski et al. | |
| 2002/0102196 A1 | 8/2002 | Smalley et al. | |
| 2002/0102201 A1 | 8/2002 | Colbert et al. | |
| 2003/0066960 A1 | 4/2003 | Colbert et al. | |
| 2003/0106998 A1 | 6/2003 | Colbert et al. | |
| 2003/0164427 A1 | 9/2003 | Glatkowski et al. | |
| 2003/0199100 A1 | 10/2003 | Wick | |
| 2004/0191157 A1 | 9/2004 | Harutyunyan et al. | |
| 2004/0197546 A1 | 10/2004 | Rinzler et al. | |
| 2004/0232073 A1 | 11/2004 | Papadimitrakopoulos | |
| 2004/0241079 A1 | 12/2004 | Takenobu et al. | |
| 2004/0245088 A1 | 12/2004 | Gardner | |
| 2004/0265209 A1 | 12/2004 | Colbert et al. | |
| 2004/0265550 A1 | 12/2004 | Glatkowski et al. | |
| 2005/0009039 A1 | 1/2005 | Jagota et al. | |
| 2005/0129382 A1 | 6/2005 | Sakakibara et al. | |
| 2005/0191493 A1 | 9/2005 | Glatkowski | |
| 2005/0199894 A1 | 9/2005 | Rinzler et al. | |
| 2005/0209392 A1 | 9/2005 | Luo et al. | |
| 2005/0221016 A1 | 10/2005 | Glatkowski et al. | |
| 2005/0254760 A1 | 11/2005 | Sakakibara et al. | |
| 2005/0260120 A1 | 11/2005 | Smalley et al. | |
| 2005/0266162 A1 | 12/2005 | Luo et al. | |
| 2006/0057290 A1 | 3/2006 | Glatkowski et al. | |
| 2006/0113510 A1 | 6/2006 | Luo et al. | |
| 2006/0188721 A1 | 8/2006 | Irvin et al. | |
| 2006/0188723 A1 | 8/2006 | Rowley et al. | |
| 2006/0213251 A1 | 9/2006 | Rinzler et al. | |
| 2006/0231399 A1 | 10/2006 | Smalley et al. | |
| 2006/0240238 A1 | 10/2006 | Boussaad et al. | |
| 2006/0242741 A1 | 10/2006 | Krupke et al. | |
| 2006/0257638 A1 | 11/2006 | Glatkowski et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2007/0045119 A1 | 3/2007 | Sandhu | |
| 2007/0048209 A1 | 3/2007 | Smalley et al. | |
| 2007/0065977 A1 | 3/2007 | Rinzler et al. | |
| 2007/0132953 A1 | 6/2007 | Silverstein | |
| 2007/0141345 A1 | 6/2007 | Rinzler et al. | |
| 2007/0224106 A1 | 9/2007 | Sakakibara et al. | |
| 2008/0038566 A1 | 2/2008 | Cody et al. | |
| 2008/0063585 A1 | 3/2008 | Smalley et al. | |
| 2008/0135815 A1 | 6/2008 | Glatkowski et al. | |
| 2008/0217588 A1 | 9/2008 | Arnold et al. | |
| 2008/0236660 A1 | 10/2008 | Rinzler | |
| 2008/0258117 A1 | 10/2008 | Sakakibara et al. | |
| 2008/0261083 A1 | 10/2008 | Rinzler et al. | |
| 2008/0299030 A1 | 12/2008 | Rinzler et al. | |
| 2009/0068241 A1 | 3/2009 | Britz et al. | |

FOREIGN PATENT DOCUMENTS

| | | |
|---|---|---|
| JP | 2006-188379 | 7/2006 |
| JP | 2006-188380 | 7/2006 |
| JP | 2008-266111 | 11/2008 |
| JP | 2008-285386 | 11/2008 |
| JP | 2008-285387 | 11/2008 |
| WO | 2004/069736 | 8/2004 |
| WO | 2004082794 | 9/2004 |
| WO | 2005/041227 | 5/2005 |
| WO | 2005/077827 | 8/2005 |
| WO | 2006/013788 | 2/2006 |
| WO | 2006/075968 | 7/2006 |
| WO | 2006/096613 | 9/2006 |
| WO | 2006/137943 | 12/2006 |
| WO | 2008/010383 | 1/2008 |
| WO | 2008/038007 | 4/2008 |
| WO | 2008/057070 | 5/2008 |
| WO | 2008/057108 | 5/2008 |
| WO | 2008143281 | 11/2008 |

OTHER PUBLICATIONS

M. S. Arnold, "Carbon nanotubes: Photophysics, biofunctionalization, and sorting via density differentiation," PhD Thesis, Northwestern University, Dec. 2006.

Arnold et al., "Enrichment of Single-Walled Carbon Nanotubes by Diameter in Density Gradients," *Nano Letters*, 5(4):713-718 (2005).

Arnold et al., "Sorting carbon nanotubes by electronic structure using density differentiation," *Nature Nanotechnology*, 1:60-65 (2006).

Arnold et al., "Hydrodynamic characterization of surfactant encapsulated carbon nanotubes using an analytical ultracentrifuge," *ACS Nano*, Oct. 3, 2008 (web).

Green et al., "Ultracentrifugation of single-walled carbon nanotubes," *Materials Today*, 10(12):59-60 (2007).

Green et al., "Colored semitransparent conductive coatings consisting of monodisperse metallic single-walled carbon nanotubes," *Nano Lett.*, 8(5):1417-1422 (2008).

Hersam, "Progress towards monodisperse single-walled carbon nanotubes," *Nature Nanotechnology*, 3:387-394 (2008).

Samsonidze et al., "Quantitative evaluation of the octadecylamine-assisted bulk separation of semiconducting and metallic single-wall carbon nanotubes by resonance Raman spectroscopy," *Applied Physics Letters*, 85(6):1006-1008 (2004).

Wu et al., "Transparent, Conductive Carbon Nanotube Films," *Science*, 305:1273-1276 (2004).

Yanagi et al., "Optical and Conductive Characteristics of Metallic Single-Wall Carbon Nanotubes with Three Basic Colors; Cyan, Magenta, and Yellow," *Applied Physics Express*, 1:034003-1-034003-3 (2008).

Zhang et al., "Transparent, Conductive, and Flexible Carbon Nanotube Films and Their Application in Organic Light-Emitting Diodes," *Nano. Letters*, 6(9):1880-1886 (2006).

Zhou et al., "A method of printing carbon nanotube thin films," *Applied Physics Letters*, 88:123109-1-123109-3 (2006).

Chattopadhyay et al., "A Route for Bulk Separation of Semiconducting from Metallic Single-Wall Carbon Nanotubes," *J. Am. Chem. Soc.*, 125:3370-3375 (2003).

Maeda et al., "Large-Scale Separation of Metallic and Semiconducting Single-Walled Carbon Nanotubes," *J. Am. Chem. Soc.*, 127:10287-10290 (2005).

Zhang et al., "Selective Etching of Metallic Carbon Nanotubes by Gas-Phase Reaction," *Science*, 314:974-977 (2006).

\* cited by examiner

TRANSPARENT ELECTRICAL CONDUCTORS PREPARED FROM SORTED CARBON NANOTUBES AND METHODS OF PREPARING SAME

CROSS REFERENCE TO RELATED APPLICATION

This application claims priority to and the benefit of U.S. Provisional Patent Application Ser. No. 60/966,592, filed on Aug. 29, 2007, the entire disclosure of which is incorporated by reference herein.

STATEMENT REGARDING FEDERALLY SPONSORED RESEARCH OR DEVELOPMENT

This invention was made with government support under grant numbers EEC0647560, DMR0520513, and DMR0706067 awarded by the National Science Foundation and grant number DAMD17-05-1-0381 awarded by the United States Army Medical Research and Materiel Command. The government has certain rights in the invention.

BACKGROUND

Transparent electrical conductors are critical components in many electronic devices, including light emitting diodes, photovoltaics, flat-panel displays, and electrochromic devices. Consequently, there is a growing demand for low-cost transparent conductors that offer not only high conductivity and transparency over a large wavelength range, but an array of other properties such as good mechanical flexibility, environmental stability, and desirable surface morphology. Currently, the most widely used transparent conductor for electronic devices is indium tin oxide (ITO). However, ITO is hindered by its relative brittleness, which degrades its performance on flexible substrates, and the limited availability of indium, a rare and expensive element obtained as a by-product of mining for other elements.

Carbon nanotubes recently have emerged as a promising alternative to ITO for transparent electrical conduction. These nanomaterials consist entirely of carbon, one of the most abundant elements on earth, and exhibit both remarkably high conductivities and exceptional mechanical properties including high tensile strength and resilience. Single-walled carbon nanotubes (SWNTs) can be thought of as nanoscale tubes formed by rolling a graphene sheet into a seamless cylinder. As a result of this structure, SWNTs are available in a large number of different chiralities—combinations of diameter and wrapping angle. The nanotube chirality defines both its electronic and optical properties, and hence is a critical parameter when incorporating nanotubes into device applications. For instance, roughly two thirds of SWNT chiralities are semiconducting, while the rest are metallic. Moreover, the first-order peaks in optical absorbance for metallic SWNTs can vary widely from roughly 450 nm to 700 nm as SWNT diameter is increased from ~0.7 nm to 1.4 nm. Although this striking dependence between SWNT atomic structure and behavior enables them to be employed in many ways, it is also regarded as one of their major weaknesses as there exist no methods of synthesizing SWNTs of uniform chirality. Instead, as-synthesized SWNTs possess a mixture of semiconducting and metallic nanotubes with varying diameters.

Transparent, electrically conductive films of carbon nanotubes have been fabricated from solvent suspensions using a number of different methods, such as airbrushing (see e.g., U.S. Patent Application Publication No. US 2005/0221016; and M. Kaempgen et al., *Appl. Surf. Sci.* 252, 425 (2005)), drop-drying (see e.g., U.S. Pat. No. 5,853,877), and vacuum filtration (see e.g., U.S. Patent Application Publication No. 2004/0197546; Z. Wu et al, *Science* 305, 1273 (2004); and Y. Zhou et al., *Appl. Phys. Lett.* 88, 123109 (2006)), the entire disclosure of each of which is incorporated by reference herein. Prior art, however, has employed unsorted mixtures with roughly 2:1 ratios of semiconducting and metallic carbon nanotubes which limit device performance since two thirds of the SWNTs are semiconducting and thus possess inferior electrical conductivity. To increase film conductivity, SWNTs can be chemically doped in strong oxidizing conditions such as through nitric acid refluxing (see e.g., A. G. Rinzler et al., *Appl. Phys. A*, 67, 29-37 (1998)). These treatments, however, can introduce defects into the nanotubes and reduce their length. Furthermore, these treatments lead to decreased film transmittance in the infrared portion of the electromagnetic spectrum. Already prepared films also can be doped through immersion in agents such as nitric acid, sulfuric acid, and thionyl chloride (see e.g., R. Graupner et al., *Phys. Chem. Chem. Phys.* 5, 5472 (2003); and D. Zhang et al., *Nano Lett.* 6, 1880 (2006)), or exposure to elements such as halogens or alkali metals see U.S. Patent Application Publication No. 2004/0197546). However, such treatments rely on intercalation and adsorption of molecules, and generally can be reversed by rinsing in water. Prior art also has employed several techniques to achieve beneficial nanotube-nanotube contacts for improved transparent conduction. For example, water rinsing and bath sonication have been attempted to induce SWNT rebundling in already prepared nanotube films (see U.S. Patent Application Publication No. 2005/0221016). Hecht et al. have studied the dimensions of SWNT bundles as a function of sonication time with the aim of improving the performance of transparent conductors (see D. Hecht et al., *Appl. Phys. Lett.* 89, 133112 (2006)).

SUMMARY

In light of the foregoing, it is an object of the present teachings to provide one or more methods and/or compositions related to carbon nanotube-based transparent electrical conductors having improved electrical and optical properties, thereby overcoming various deficiencies and shortcomings of the prior art.

In part, the present teachings can be directed to employing a sorted population of carbon nanotubes that are predominantly metallic for use in transparent electrical conductors (e.g., optically transparent, electrically conductive films). In contrast to prior art, embodiments of the present transparent electrical conductors including such materials have a larger proportion of carbon nanotubes contributing to electrical conduction without the adverse effects associated with chemical doping. Consequently, transparent conductive films of the present teachings typically exhibit improved conductivity compared to films produced from unsorted nanotubes at the same transmissivity.

In part, the present teachings can be directed to employing carbon nanotubes sorted according to optical absorbance for use in transparent electrical conductors. In such embodiments, the transmissivity at a desired wavelength is increased by employing combinations of sorted nanotubes without van Hove transitions at that wavelength. Transmissivity is further enhanced by concomitant removal of absorptive impurities during the sorting process.

In part, the present teachings can be directed to employing carbon nanotubes with optical transitions at a desired wavelength for use in transparent electrical conductors. In such embodiments, the electrical conductors can be semi-transparent and can have a visible color. For example, the color can be tailored for particular optical filtering applications.

In part, the present teachings can be directed to employing carbon nanotube bundles selected according to buoyant density for use in transparent electrical conductors. Bundles of a particular buoyant density can have an optimal shape (e.g., long and thin) for incorporation into a transparent conducting network of nanotubes. Such bundles can result in improved nanotube-nanotube contacts and reduce the number of nanotube-nanotube junctions required for charge transport across the conductive film. The bundle buoyant density can be engineered through use of one or more surfactants, density gradient media, and/or solvents.

In part, the present teachings can be directed to rebundling carbon nanotubes dispersed in solution through dilution into a second solution containing one or more other surfactants and/or a different solvent. Over time, the proportion of the surfactants and/or solvent from the second solution coating the nanotube sidewalls increases, and through judicious selection of the diluent constituents, nanotube bundles optimized for transparent conduction can be formed. Further control over bundling can be achieved by limiting the time the SWNTs are in the diluent before they are incorporated into a film. Such techniques for rebundling SWNTs are of particular importance when employing sorted carbon nanotubes in conductive films. After sorting, SWNTs are typically individually encapsulated by surfactants and as such may not produce optimal nanotube-nanotube contacts when processed into films. Rebundling techniques that do not require precipitation and resuspension of SWNTs will save time and reduce the likelihood of nanotube degradation through repeated processing.

More specifically, in one aspect, the present teachings provide colored transparent conductive films. The colored transparent conductive films can have an average transmittance of greater than about 75% in the visible spectrum (e.g., having an average transmittance of greater than about 80% in the visible spectrum, having an average transmittance of greater than about 90% in the visible spectrum, or having a transmittance of greater than about 80% at a particular wavelength such as ~550 nm within the visible spectrum), a sheet resistance of less than about $1.0 \times 10^3$ Ω/square (e.g., less than about 600 Ω/square, less than about 500 Ω/square, less than about 400 Ω/square, less than about 300 Ω/square less than about 200 Ω/square, or less than about 100 Ω/square), and a visible color; wherein the film includes single-walled carbon nanotubes (e.g., separated or rebundled). The color of the film can be directly attributed to the optical properties of the single-walled carbon nanotubes in the film; that is, no dye or chromophore or other external agents are used to create the color of the film. In addition, the single-walled carbon nanotubes in the film can be predominantly metallic. These metallic single-walled carbon nanotubes can absorb wavelengths differentially within the visible spectrum to provide the visible color of the film. For example, the color of the film can be controlled by the diameter of the single-walled carbon nanotubes in the film. As such, the single-walled carbon nanotubes in the film generally have a very narrow diameter variance, for example, a diameter variance of less than or about ±0.1 nm (e.g., less than or about ±0.05 nm). In some embodiments, the single-walled carbon nanotubes can have a mean diameter selected from 0.9 nm (±0.1 nm), 1.0 nm (±0.1 nm), 1.05 nm (±0.1 nm), 1.1 nm (±0.1 nm), 1.4 nm (±0.1 nm), and 1.6 nm (±0.1 nm). In particular embodiments, the visible color of the film can be selected from red (having an absorption peak at about 508 nm), magenta (having an absorption peak at about 561 nm), violet (having absorption peaks at about 562 nm and about 606 nm), cyan (having an absorption peak at about 612 nm), yellow (having absorption peaks at about 397 nm and about 721 nm), and green (having absorption peaks at about 400 nm and about 780 nm). The single-walled carbon nanotubes in the film can be synthesized by various methods including laser ablation, arc-discharge, or high-pressure carbon monoxide conversion. In various embodiments, the film can have a thickness of less than about 100 nm.

In one aspect, the present teachings provide methods of preparing a transparent conductive film having a preselected visible color. The methods can include isolating a separation fraction from a mixture of semiconducting single-walled carbon nanotubes and metallic single-walled carbon nanotubes, wherein the separation fraction includes separated single-walled carbon nanotubes and greater than about 50% (e.g., greater than about 80%) of the separated single-walled carbon nanotubes in the separation fraction are metallic. The separated single-walled carbon nanotubes can have a diameter variance of less than or about ±1.0 nm. Such a separation fraction then can be processed into a transparent conductive film having a preselected visible color. The methods can further include processing one or more separation fractions including a predetermined volume, wherein the one or more separation fractions together can include a predetermined amount of separated single-walled carbon nanotubes. The one or more separated fractions can be concentrated (and/or purified) to provide a concentrated separation fraction (e.g., by filtration through a filter membrane). The concentrated separation fraction subsequently can be processed into a transparent conductive film using one or more techniques known in the art including vacuum filtration, air brushing, drop drying, spin casting, printing (e.g., inkjet printing), and stamping.

In certain embodiments, the single-walled carbon nanotubes in the mixture can have diameter dimensions ranging from about 1.0 nm to about 1.2 nm. In such embodiments, the transparent conductive film can have an average transmittance of greater than about 80% in the visible spectrum and a sheet resistance of less than about $1.0 \times 10^3$ Ω/square, and an average transmittance of greater than about 90% in the near-infrared spectrum and a sheet resistance of less than about $1.0 \times 10^3$ Ω/square. In other embodiments, the single-walled carbon nanotubes in the mixture can have diameter dimensions ranging from about 1.2 nm to about 1.7 nm. In such embodiments, the transparent conductive film can have an average transmittance of greater than about 80% at a wavelength of 550 nm and a sheet resistance of less than about 600 Ω/square.

Another aspect of the present teachings provides methods of preparing a transparent conductive film that includes a plurality of bundles of single-walled carbon nanotubes. The methods can involve centrifuging a fluid medium that includes a density gradient and a composition including one or more surface active components and a plurality of bundles of single-walled carbon nanotubes to provide two or more separation fractions along the density gradient, wherein each of the separation fractions has a unique buoyant density and includes a plurality of bundles of single-walled carbon nanotubes. The methods can further involve isolating at least one of the separation fractions from the fluid medium to provide an isolated separation fraction, and processing the isolated separation fraction into a transparent conductive film. For example, the isolated separation fraction can be processed into a transparent conductive film by vacuum filtration. In certain embodiments, the bundles of single-walled carbon nanotubes in the composition can include single-walled carbon nanotubes having diameter dimensions ranging from about 1.1 nm to about 1.6 nm. In particular embodiments, the transparent conductive film can have an average transmittance of greater than about 70% in the visible spectrum and a sheet resistance of less than about 180 Ω/square.

In another aspect, the present teachings provide methods of preparing a transparent conductive film that includes single-walled carbon nanotubes. The methods can involve diluting a first composition that includes one or more ionic surface active components and separated single-walled carbon nanotubes in a second composition that includes a non-ionic surface active component to provide a diluted composition, wherein greater than about 50% of the separated single-walled carbon nanotubes are metallic. The methods can further involve allowing the separated single-walled carbon nanotubes in the diluted composition to form bundles of single-walled carbon nanotubes, and processing the diluted composition into a transparent conductive film. For example, the diluted composition can be processed into a transparent conductive film by vacuum filtration. In certain embodiments, the separated single-walled carbon nanotubes can have diameter dimensions ranging from about 1.0 nm to about 1.2 nm. In particular embodiments, the transparent conductive film can have an average transmittance of greater than about 80% in the visible spectrum and a sheet resistance of less than about $1.0 \times 10^3$ Ω/square.

In a further aspect, the present teachings provide methods of preparing an electrically conductive film having a preselected visible color. The methods can involve isolating a separation fraction from a mixture of single-walled carbon nanotubes that includes a range of nanotube diameters to provide an isolated separation fraction, wherein the isolated separation fraction includes separated single-walled carbon nanotubes. The methods can further involve processing the isolated separation fraction into a transparent conductive film, wherein the transparent conductive film absorbs at a preselected wavelength range in the visible spectrum while having an average transmittance of greater than about 50% in the visible spectrum. In certain embodiments, the preselected visible color can be provided by isolating a separation fraction wherein greater than about 75% of the separated single-walled carbon nanotubes have a diameter within less than about 0.1 nm (e.g., less than about 0.05 nm) of the mean diameter of all the separated single-walled carbon nanotubes in the separation fraction (i.e., the diameter sorting can be narrowed to Angstrom-level).

Also embraced within the scope of the present teachings are fully and partially optically transparent and electrically conductive films prepared by the methods and/or having electrical and/or optical properties described herein.

The foregoing, other features, and advantages of the present teachings, will be more fully understood from the following figures, description, and claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

It should be understood that certain drawings are not necessarily to scale, with emphasis generally being placed upon illustrating the principles of the present teachings. The drawings are not intended to limit the scope of the present teachings in any way.

FIG. 3A shows the transmittance of sorted metallic (curves 132 and 134) and unsorted P2 films (curve 136) normalized at a wavelength of 320 nm. FIG. 3B is a graphical depiction of the percent transmittance at about 550 nm of transparent conductors as a function of sheet resistance (unsorted—solid triangles; sorted—open squares and open circles).

FIG. 10A shows the normalized optical absorbance spectra of unsorted LA SWNTs compared to sorted, bundled LA SWNTs. FIG. 10B is a graphical depiction of the percent transmittance in the wavelength range of 400 nm to 700 nm of transparent conductors as a function of sheet resistance.

DETAILED SPECIFICATION

Figure 1:
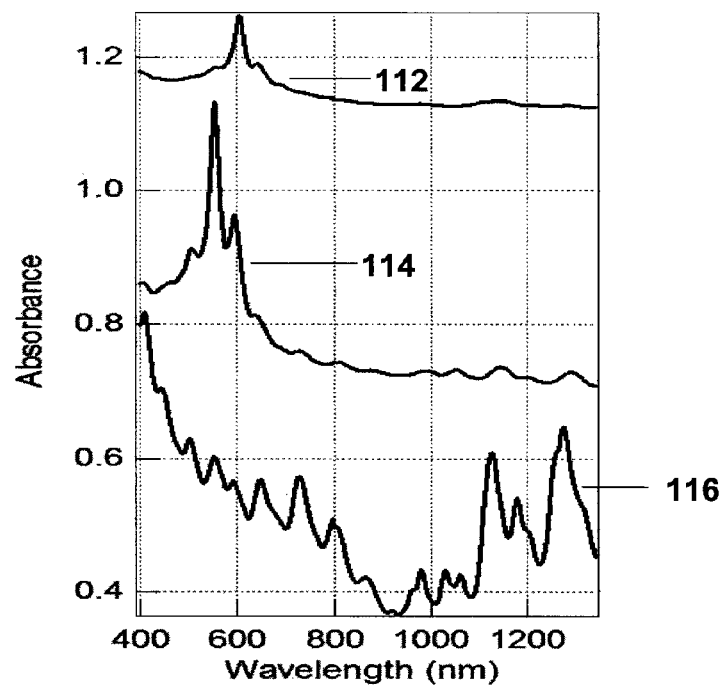
FIG. 1A shows the optical absorbance spectra of two sorted metallic HiPco SWNT solutions (Solutions A and B) according to an embodiment of the present teachings. Curves are offset for clarity.
FIG. 1B shows the transmittance spectra, normalized at ~260 nm, obtained from films of unsorted and sorted metallic HiPco SWNTs.
Figure 1:
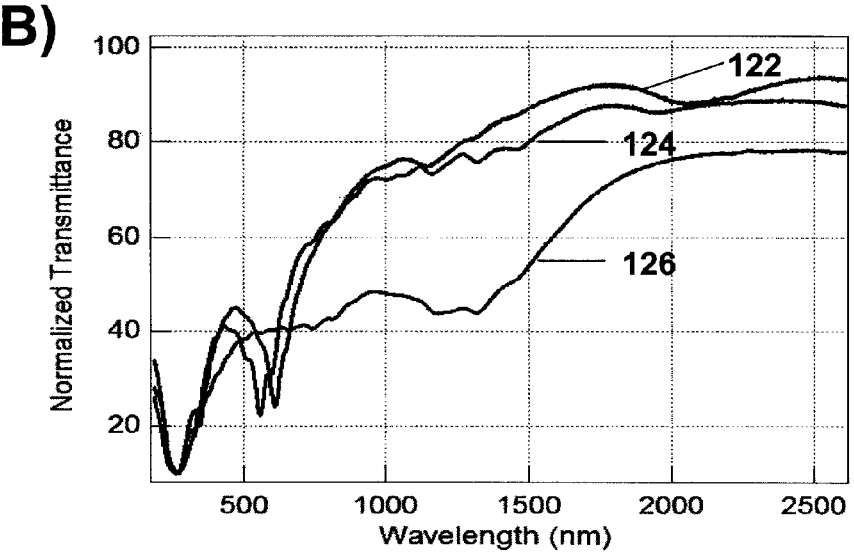

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited processing steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The present teachings can provide transparent electrical conductors, specifically, continuous optically transparent and electrically conductive films, including sorted single-walled carbon nanotubes (SWNTs) and/or SWNT bundles that demonstrate enhanced conductivity and transmissivity compared to prior art films produced using unsorted SWNTs and SWNT bundles. The improved properties of the present transparent electrical conductors can be attributed in part to the improved purity of the SWNT and/or SWNT bundles. More specifically, the present teachings employ SWNTs and SWNT bundles that have been pre-sorted according to electronic type, diameter, and/or bundle density, and as a result, these SWNTs and SWNT bundles have more uniform optical and electrical characteristics and/or optimal shape compared to unsorted SWNTs and SWNT bundles.

To improve their optical and electrical characteristics, as-synthesized SWNTs which include a large number of different chiralities can be sorted according to one or more physical and/or chemical properties (including the diameter dimensions and/or the electronic type) of the individual SWNTs. More specifically, a sorting method based on density gradient ultracentrifugation (DGU) can be used as described in co-pending U.S. patent application Ser. Nos. 11/368,581 and 11/897,125, the entire disclosure of each of which is incorporated by reference herein.

As-synthesized SWNTs can be optionally purified and/or concentrated prior to sorting. Examples of pre-sorting treatment techniques include oxidation, acid treatment, etching, and dedoping. For the sorting process, as-synthesized SWNTs generally are dispersed in an aqueous solution using one or more surface active components. By controlling the type and amount of the surface active components encapsulating the SWNTs, for example, the relative ratio of the surface active components when more than one surface active component is used, it is possible to engineer subtle differences in the buoyant density of the nanotubes according to their diameter and electronic type. These density differences can then be exploited by centrifuging the nanotube solution inside a density gradient provided by a fluid medium. Over the course of the ultracentrifugation, the different chiralities of SWNTs move independently to their respective isopycnic points, i.e., points inside the gradient at which sedimentation stops due to a matching of the buoyant density of the SWNTs with the buoyant density of the fluid medium. Subsequently, the nanotubes can be removed layer by layer from the density gradient. This general method allows sorting of SWNTs as a function of structure and/or one or more other properties without irreversibly modifying the nanotubes chemically or structurally, and can achieve simultaneous selectivity of diameter and chirality, diameter and electronic type, electronic type and chirality, or independent selectivity of diameter, electronic type, or chirality.

The buoyant density of a SWNT in a fluid medium can depend on multiple factors, including the mass and volume of the carbon nanotube itself, its surface functionalization, and electrostatically bound hydration layers. For example, surface functionalization of the carbon nanotubes can be non-covalent, and can be achieved by encapsulating the carbon nanotubes with one or more surface active components (e.g., surfactants). Accordingly, the general method described above can include contacting single-walled carbon nanotubes of varying structures and/or properties with at least one surface active component (e.g., surfactant), to provide a differential buoyant density among the SWNTs when the complexes formed by the surface active component(s) and the SWNTs are placed in a fluid medium that includes a density gradient. The differential buoyant density can be a function of nanotube diameter, band gap, electronic type and/or chirality, thereby allowing separation of the single-walled carbon nanotubes by diameter, band gap, electronic type and/or chirality.

Generally, density gradient centrifugation uses a fluid medium with a predefined variation in its density as a function of position within a centrifuge tube or compartment (i.e., a density gradient). Fluid media useful with the present teachings are limited only by carbon nanotube aggregation therein to an extent precluding at least partial separation. Accordingly, aqueous and non-aqueous fluids can be used in conjunction with any substance soluble or dispersible therein, over a range of concentrations so as to provide the medium a density gradient for use in the separation techniques described herein. Such substances can be ionic or non-ionic, non-limiting examples of which include inorganic salts and alcohols, respectively. Such a medium can include a range of aqueous iodixanol concentrations and the corresponding gradient of concentration densities. As understood by those in the art, aqueous iodixanol is a common, widely used non-ionic density gradient medium. However, other media can be used with good effect, as would also be understood by those individuals.

More generally, any material or compound stable, soluble or dispersible in a fluid or solvent of choice can be used as a density gradient medium. A range of densities can be formed by dissolving such a material or compound in the fluid at different concentrations, and a density gradient can be formed, for instance, in a centrifuge tube or compartment. More practically, with regard to choice of medium, the carbon nanotubes, whether or not functionalized, should also be soluble, stable or dispersible within the fluids/solvent or resulting density gradient. Likewise, from a practical perspective, the maximum density of the gradient medium, as determined by the solubility limit of such a material or compound in the solvent or fluid of choice, should be at least as large as the buoyant density of the particular carbon nanotubes (and/or in composition with one or more surface active components, e.g., surfactants) for a particular medium. Accordingly, any aqueous or non-aqueous density gradient medium can be used providing the single-walled carbon nanotubes are stable; that is, do not aggregate to an extent precluding useful separation. Alternatives to iodixanol include inorganic salts (such as CsCl, $Cs_2SO_4$, KBr, etc.), polyhydric alcohols (such as sucrose, glycerol, sorbitol, etc.), polysaccharides (such as polysucrose, dextrans, etc.), other iodinated compounds in addition to iodixanol (such as diatrizoate, nycodenz, etc.), and colloidal materials (such as Percoll®). Other parameters which can be considered upon choice of a suitable density gradient medium include the diffusion coefficient and the sedimentation coefficient, both of which can determine how quickly a gradient redistributes during centrifugation. Generally, for more shallow gradients, a larger diffusion coefficient and a smaller sedimentation coefficient are desired.

Regardless of medium identity or density gradient, the as-synthesized SWNTs can be introduced into the fluid medium on or at any point within the gradient before centrifugation. For example, the as-synthesized SWNTs can be introduced at a spatial point along the gradient where the density remains roughly constant over time even as the density gradient becomes steeper over the course of centrifugation. Such an invariant point can be advantageously determined to have a density corresponding to about the buoyant density of the nanotube composition(s) introduced thereto.

Prior to introduction into the density gradient medium, the SWNTs can be provided in a composition with one or more surface active components, two or more surface active components, or three or more surface active components. In some embodiments, the loading of the one or more surface active components in the composition can be selected to increase buoyant density differences among carbon nanotubes of different electrical properties and/or diameters. In addition, in embodiments where two or more surface active components are used, the relative ratio of the two or more surface active components can be selected to cause metallic carbon nanotubes to have a higher buoyant density than semiconducting carbon nanotubes. In addition, the surface active component(s) can function, in conjunction with the fluid medium, to reduce nanotube aggregation.

The one or more surface active components can include one or more surfactants selected from a wide range of non-ionic or ionic (cationic, anionic, or zwitterionic) amphiphiles. In some embodiments, the one or more surface active components can include an anionic surfactant. For example, the one or more surface active components can include one or more sulfates, sulfonates, carboxylates, and combinations thereof. In certain embodiments, the one or more surface active components can include one or more bile salts (including cholates, deoxycholates, taurodeoxycholates and combinations thereof), one or more amphiphiles with anionic head groups and flexible alkyl tails (referred interchangeably herein below as anionic alkyl amphiphiles; examples of which include dodecyl sulfates and dodecylbenzene sulfonates), and/or one or more amphiphiles with cationic head groups (e.g., quaternary ammonium salts) and flexible or rigid alkyl tails. Examples of bile salts include sodium cholate (SC), sodium deoxycholate, and sodium taurodeoxycholate. Examples of amphiphiles with anionic head groups and flexible alkyl tails include sodium dodecyl sulfate (SDS) and sodium dodecylbenzene sulfonate (SDBS). More generally, the bile salts above can be more broadly described as planar surface active components because of their planar and rigid molecular structures. These planar amphiphiles can have a charged face opposing a hydrophobic face. Without wishing to be bound by any particular theory, it is believed that these bile salts (or other surface active components having characteristics similar to these bile salts) are capable of providing a planar and/or rigid structural configuration about and upon interaction with carbon nanotubes, which can induce differential nanotube buoyant density. Amphiphiles having a linear (flexible or rigid) aliphatic tail group (coupled with either an anionic or cationic head group) described above can be generally referred herein as linear surface active components. In some embodiments, DNA (e.g., single-stranded DNA) or DNA fragments also can be used as the surface active component as described in U.S. patent application Ser. No. 11/368,581.

In some embodiments, the as-synthesized SWNTs can be provided in a composition with at least two surface active components, wherein the at least two surface active components can be of the same type or of different types. In some embodiments, the at least two surface active components can adsorb to the SWNT surface. That is, the at least two surface active components can be two different surfactants. Such a co-surfactant system can be used to achieve optimal separation between metallic and semiconducting single-walled carbon nanotubes. For example, the at least two surface active components can include two bile salts, a bile salt with a surfactant, or two bile salts with a surfactant. In certain embodiments, the two or more surface active components can include one or more planar surface active components (e.g., sodium cholate (SC), sodium deoxycholate, and sodium taurodeoxycholate) and a linear surface active component (e.g., sodium dodecyl sulfate (SDS)). In certain embodiments, the use of a co-surfactant system including varying amounts of sodium dodecyl sulfate and sodium cholate was observed to afford good selective separation of SWNTs by electronic type. The metal-semiconductor selectivity observed seems to indicate a certain degree of coupling of the surfactant(s) and/or their hydration with the electronic nature of the underlying SWNTs. Additionally, the packing density of the surfactants and their hydration likely may be sensitive to electrostatic screening by the underlying SWNTs.

Density gradient centrifugation can be used with comparable effect for the separation of a wide range of surfactant-encapsulated SWNTs. Without limitation to any one theory or mode of operation, surfactant-based separation via density gradient centrifugation is believed to be driven largely by how the surface active component(s), e.g., surfactant(s), organize around SWNTs of different structure and electronic type. The energetic balance among nanotube-, water- and surfactant-surfactant interactions as well as their packing density, orientation, ionization, and the resulting hydration of these surfactants can all be parameters affecting buoyant density and the quality of separation and purification.

Upon sufficient centrifugation (i.e., for a selected period of time and/or at a selected rotational rate at least partially sufficient to separate the carbon nanotubes along the medium gradient), at least one separation fraction including separated single-walled carbon nanotubes can be separated from the medium. Such fraction(s) can be isopycnic at a position along the gradient. An isolated fraction can include substantially monodisperse single-walled carbon nanotubes, for example, in terms of at least one characteristic selected from nanotube diameter dimensions, chiralities, and electronic type. Various fractionation techniques can be used, including upward displacement, aspiration (from meniscus or dense end first), tube puncture, tube slicing, cross-linking of gradient and subsequent extraction, piston fractionation, and any other fractionation techniques known in the art.

The medium fraction and/or nanotube fraction collected after one separation can be sufficiently selective in terms of separating the carbon nanotubes by the at least one selected property (e.g. electronic type). However, it can be desirable to further purify the fraction to improve its selectivity. Specifically, an isolated fraction can be provided in a composition with the same surface active component system or a different surface active component system, and the composition can be contacted with the same fluid medium or a different fluid medium, where the fluid medium can have a density gradient that is the same or different from the fluid medium from which the isolated fraction was obtained. In certain embodiments, fluid medium conditions or parameters can be maintained from one separation to another. In certain other embodiments, at least one iterative separation can include a change of one or more parameters including the identity of the surface active component(s), medium identity, medium density gradient and/or medium pH, as well as the duration and the rotational speed of the centrifugation process, with respect to one or more of the preceding separations. In certain embodiments, the surfactant(s) encapsulating the SWNTs can be modified or changed between iterations, allowing for even further refinement of separation, as the relationship between density and the physical and electronic structure will vary as a function of any resulting surfactant/encapsulation layer. Separation fractions isolated after each separation can be washed before further complexation and centrifugation steps are performed.

The selectivity of the fraction(s) collected can be confirmed by various analytical methods. For example, optical techniques including spectroscopic techniques such as spectrophotometric analysis and fluorimetric analysis can be used. Such techniques generally include comparing one or more absorbance and/or emission spectra with a corresponding reference spectrum. The isolated nanotube fraction generally has a narrower distribution in the variance of the at least one selected property. For example, compared to as-synthesized SWNTs, which normally contain two-thirds of semiconducting SWNTs and one-third of metallic SWNTs, SWNTs that have been pre-sorted using the general method described above can contain greater than 50% metallic SWNTs. Accordingly, films prepared from SWNTs that have been pre-sorted by electronic type and are predominantly metallic can offer improved electrical conductivity due to the larger proportion of metallic nanotubes compared to films prepared from unsorted SWNTs. Similarly, films prepared from SWNTs that have been pre-sorted according to optical absorbance can offer enhanced transmissivity at a desired wavelength range due to the judicious use of sorted nanotubes without van Hove transitions at that wavelength and concomitant removal of absorptive impurities during the sorting process. The present teachings therefore allow enhanced optical and electrical performance of transparent electrical conductors by improving the quality of the SWNT starting material, as opposed to post-treatments (e.g., chemical doping) following the fabrication of the transparent electrical conductors.

To demonstrate the improved performance of films derived from such sorted nanotubes, as-synthesized SWNTs were run through a density gradient optimized to sort by both electronic type and diameters. Iodixanol was employed as the density gradient medium and the gradient typically contained a mixture of two surface active components at specific ratios and loadings. After centrifugation, tight colored bands of sorted nanotubes were observed at different densities in the centrifuge tube. These colored bands were found to correspond to refined collections of SWNTs of particular chiralities and provide evidence of enrichment according to diameter and electronic type. The sorted nanotubes were subsequently fractionated for characterization through optical absorbance.

Following characterization, the nanotube solutions were processed into films using vacuum filtration and transferred to glass and quartz substrates following methods developed by Rinzler et al. See U.S. Patent Application Publication No. 2004/0197546 and Z. Wu et al. (2004), Science 305: 1273-1276, each of which is incorporated by reference herein. The general methodology involves mixing a nanotube solution containing the isolated fraction with a surfactant to provide a SWNT suspension, diluting the SWNT suspension in an aqueous solution (e.g., an aqueous solution including the same surfactant as the SWNT suspension), filtering the diluted SWNT suspension through a filter membrane, and removing the solution by vacuum filtration such that only the SWNTs remain behind and form a thin film. The stabilizing agent can be subsequently washed away and the film can be allowed to dry.

In one embodiment, as-synthesized SWNTs produced through high pressure carbon monoxide conversion (HiPco; Carbon Nanotechnologies, Inc.) were run through a density gradient including a 3-to-2 ratio of SDS-to-SC (3:2 SDS/SC, by weight) and loaded such that the overall surfactant concentration was 1.5% w/v. After centrifugation, the SWNT dispersion separated into multiple bands of materials. Among these bands of materials, a buoyant cyan band and a buoyant magenta band could be seen above a thick black band that includes semiconducting nanotubes, carbonaceous impurities, and bundled nanotubes. FIG. 1A shows, the optical absorbance spectra of the sorted fraction that corresponds to the cyan band (curve 112, Solution A), the sorted fraction that corresponds to the magenta band (curve 114, Solution B), and unsorted HiPco material (curve 116). Referring to curves 112 and 114 in FIG. 1A, the suppression of absorbance peaks for wavelengths longer than about 700 nm (associated with semiconducting transitions) provides evidence of the predominant metallic nature of both sorted fractions. Furthermore, these fractions exhibited sharp diameter distributions with strongly peaked optical absorbance spectra, with distributions centered at about 553 nm corresponding to ~0.98 Å diameter SWNTs (Solution A) and those centered at about 605 nm corresponding to ~1.14 nm diameter SWNTs (Solution B). The metal purity of both these solutions was greater than about 94%.

FIG. 1B contains the transmittance measurements 122 and 124 of sorted nanotube films prepared from Solutions A and B, respectively, and the transmittance measurements 126 of control films generated from the unsorted material on quartz normalized by the $\pi$-plasmon resonance at ~270 nm. As shown, films prepared from the sorted metallic nanotubes have significantly higher transmittance in the near-infrared (curves 122 and 124). Without wishing to be bound by any particular theory, this effect is believed to be a result of both the removal of semiconducting nanotubes, damaged or defective nanotubes, and amorphous carbon impurities. Moreover, the transmittance was also observed to have increased over much of the visible spectrum at the expense of low transmittance regions centered about the wavelengths associated with metallic SWNT optical transitions.

Figure 2:
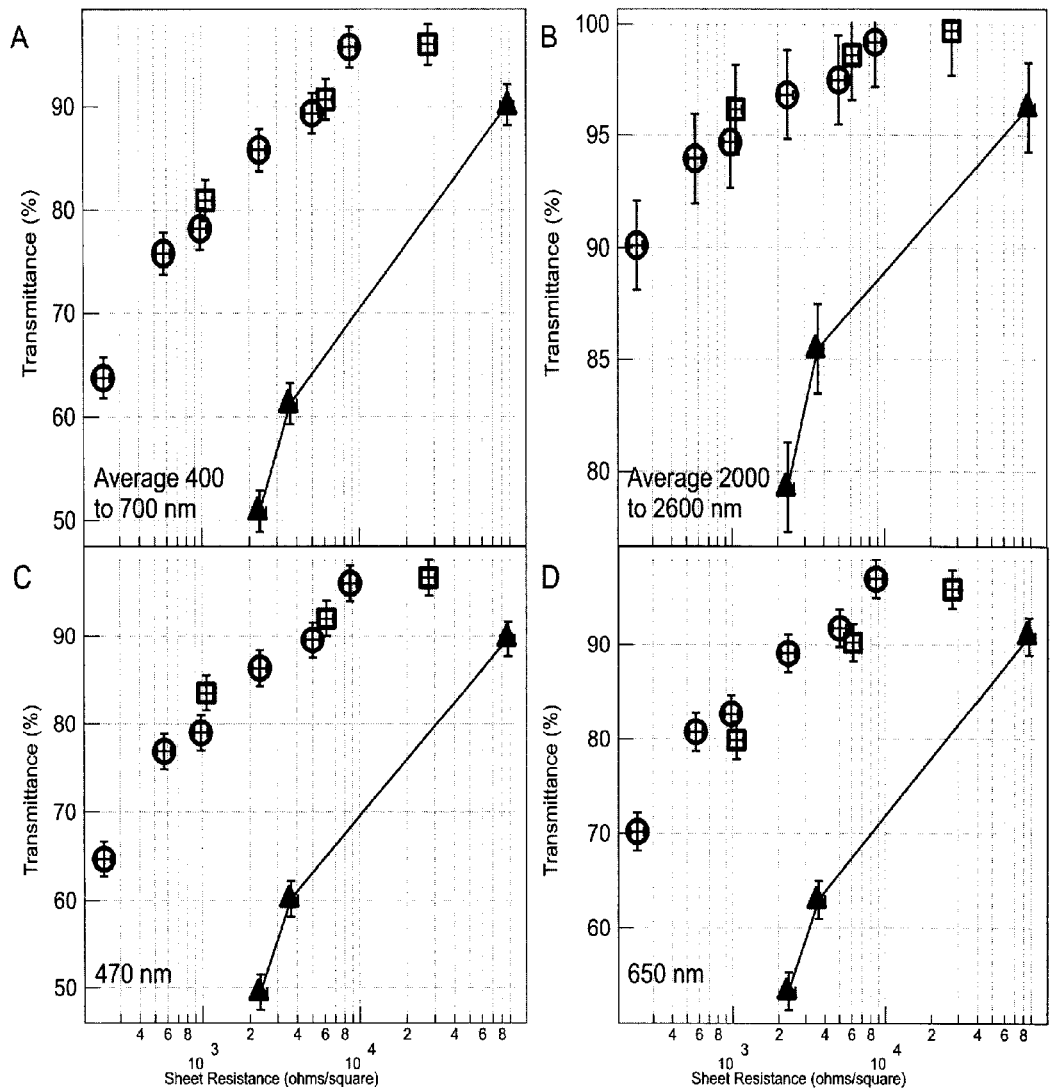
FIG. 2A-D show the performance of transparent electrical conductors produced from unsorted (solid triangles) and sorted metallic HiPco SWNTs (Solution A—open squares, Solution B—open circles), in particular, their transmittance over particular wavelength ranges as a function of sheet resistance: (A) visible wavelengths from 400 nm to 700 nm; (B) near-infrared from 2000 nm to 2600 nm; (C) at 470 nm; and (D) at 650 nm.

To determine the effect of nanotube sorting on transparent conductor performance, the sheet resistance and transmittance of a series of films generated from sorted and unsorted HiPco solutions were measured. FIGS. 2A-D present the transmittance of these films (prepared from sorted Solution A—open squares; prepared from sorted Solution B—open circles; unsorted—solid triangles) over particular wavelength ranges as a function of sheet resistance. For visible transmittance (about 400 nm to about 700 nm), the films derived from sorted metallic SWNTs displayed a roughly 20-fold decrease in sheet resistance compared to unsorted material (FIG. 2A), while the sheet resistance decreased further by a factor of roughly 30 in the near-infrared range of about 2000 nm to about 2600 nm wavelengths (FIG. 2B). At select visible wavelengths (about 470 nm and about 650 nm) corresponding to minima in the optical absorbance of the sorted SWNTs, the decreases in sheet resistance were observed to be further enhanced and the conductivity of metal SWNT films can improve by a factor of about 25 compared to unsorted films of the same transparency (FIGS. 2C-D). As shown by these data, increasing the proportion of metallic SWNTs in transparent conductive films (which results in a greater proportion of nanotubes in the network contributing to conduction) can lead to decreases in sheet resistance. Further, removal of semiconducting SWNTs and additional carbonaceous impurities during the sorting process also can improve the transmissivity of the resulting films.

The improvements observed and described above are not limited to a particular source of SWNTs. To demonstrate the general applicability of the present teachings, additional films were prepared from sorted metallic SWNTs of various sources and were characterized and compared to control films prepared from unsorted materials. More specifically, electric arc discharge (AD)-synthesized P2 SWNTs (Carbon Solutions, Inc.) with as-synthesized diameters ranging from about 1.2 nm to about 1.7 nm were sorted in a density gradient optimized to separate metallic SWNTs with diameters between about 1.4 nm and about 1.6 nm. In this gradient, the total surfactant loading was 1% w/v with a 7:3 SDS/SC ratio by weight. Following centrifugation, fractionation and optical characterization yielded two sorted metallic SWNT solutions. Solution C contained greater than about 95% metallic SWNTs of roughly 1.6 nm average diameter and Solution D contained greater than about 88% metallic SWNTs of roughly 1.4 nm average diameter.

Figure 3:
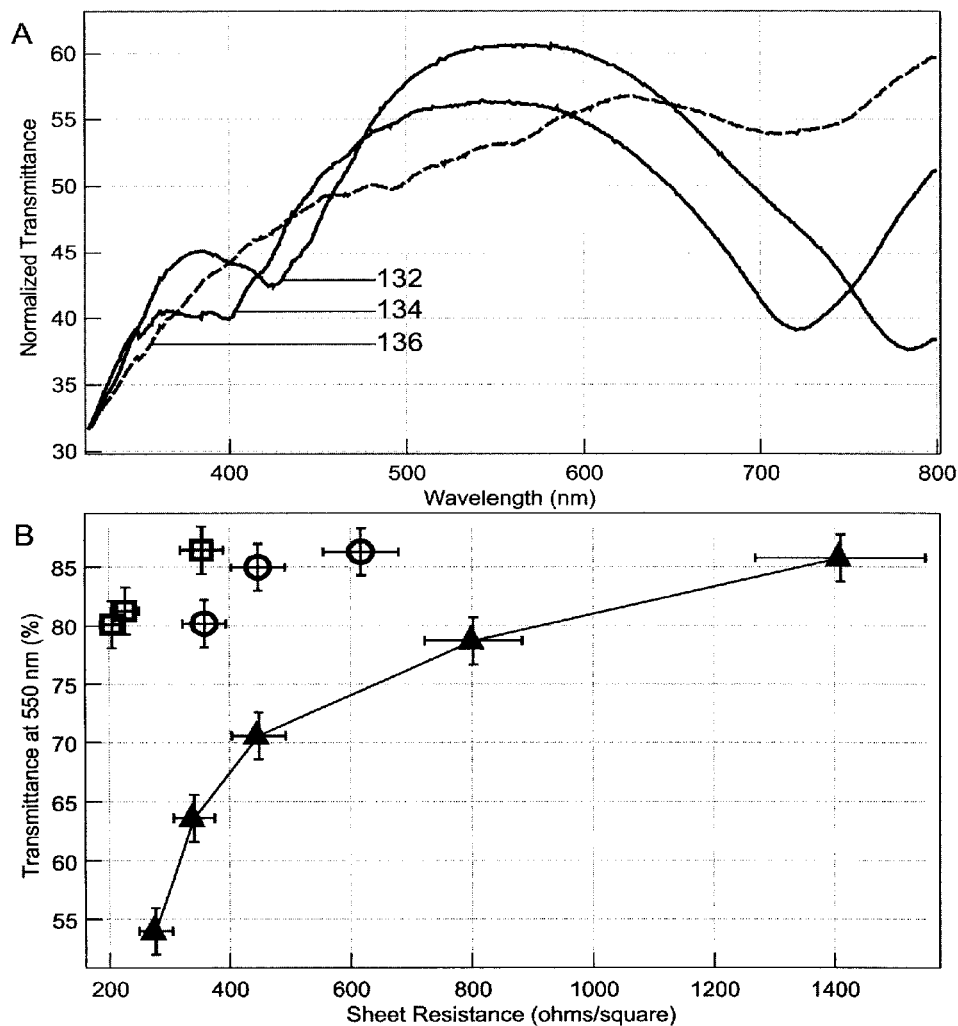
FIGS. 3A-B show the performance of transparent electrical conductors produced from unsorted and sorted metallic arc-discharge P2 SWNTs.

When these sorted SWNTs were incorporated into transparent conductive films, they exhibited high transparency windows centered about the middle of the visible spectrum as a result of their diameter. FIG. 3A shows the normalized transmittance spectra of the films prepared from Solution C (curve 122), Solution D (curve 124), and unsorted SWNTs as synthesized by arc discharge (curve 126). The sorted metal films exhibit local transmittance maxima near 550 nm. Sheet resistance measurements show that the higher purity metallic SWNTs from Solution C (>95% metallic, open squares) exhibited a roughly four-fold decrease in sheet resistance compared to unsorted P2 SWNTs (solid triangles) for similar transmissivities at 550 nm wavelength (FIG. 3B). For films generated from the lower purity Solution D (>88% metallic, open circles), the sheet resistance decreased by approximately a factor of 2.5.

Figure 4:
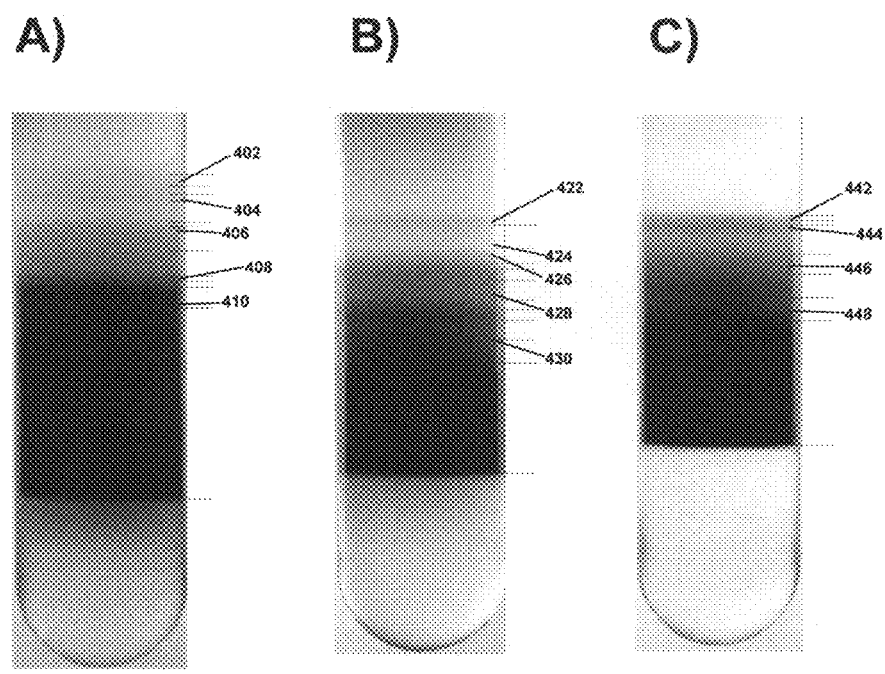
FIGS. 4A-C show photographic images of centrifuge tubes following sorting procedures according to the present teachings using as-synthesized SWNTs produced by HiPco (A), laser-ablation (B), and arc discharge (C).

To further demonstrate the present teachings, additional samples of SWNTs produced through HiPco (diameter ~0.7-1.3 nm; Carbon Nanotechnologies Inc., TX), laser-ablation (LA; diameter ~1.1-1.4 nm; Carbon Nanotechnologies Inc., TX), and electric arc discharge (AD; diameter ~1.3-1.7 nm; Carbon Solutions Inc., CA) were sorted and transparent conductive films were prepared from the sorted fractions according to the present teachings. For each of these starting materials, SWNTs dispersed in surfactants were concentrated and then ultracentrifuged in density gradients loaded with surfactants sodium cholate (SC) and sodium dodecyl sulfate (SDS) mixed in a 3:2 SDS/SC ratio. Following separation, highly refined metallic SWNTs having relatively low buoyant densities converged to multiple colored bands near the top of the density gradient corresponding to SWNTs with diameters ranging from about 0.7 nm to about 1.7 nm (FIGS. 4A-C). In addition to the choice of surface active components and their relative ratios, high-resolution sorting of the large diameter range (about 0.7 nm to about 1.7 nm) was achieved, in part, by varying the overall loading of surfactants inside the gradients. While the mode of separation (metallic or semiconducting) is largely insensitive to changes in surfactant loading, modification of this parameter can affect the thickness of the surfactant shell surrounding the SWNTs. Because the buoyant density of a SWNT can be strongly influenced by this surfactant shell, one can engineer larger differences in the buoyant density of SWNTs in a specific diameter range by controlling the surfactant loading and in turn improve the diameter refinement provided by DGU. Independent of the surfactant level, the buoyant density of the metallic SWNTs in 3:2 SDS/SC environments is inversely related to their diameter, with the largest diameter SWNTs banding at the top of the gradient and smaller diameter material converging in progressively lower regions.

Figure 5:
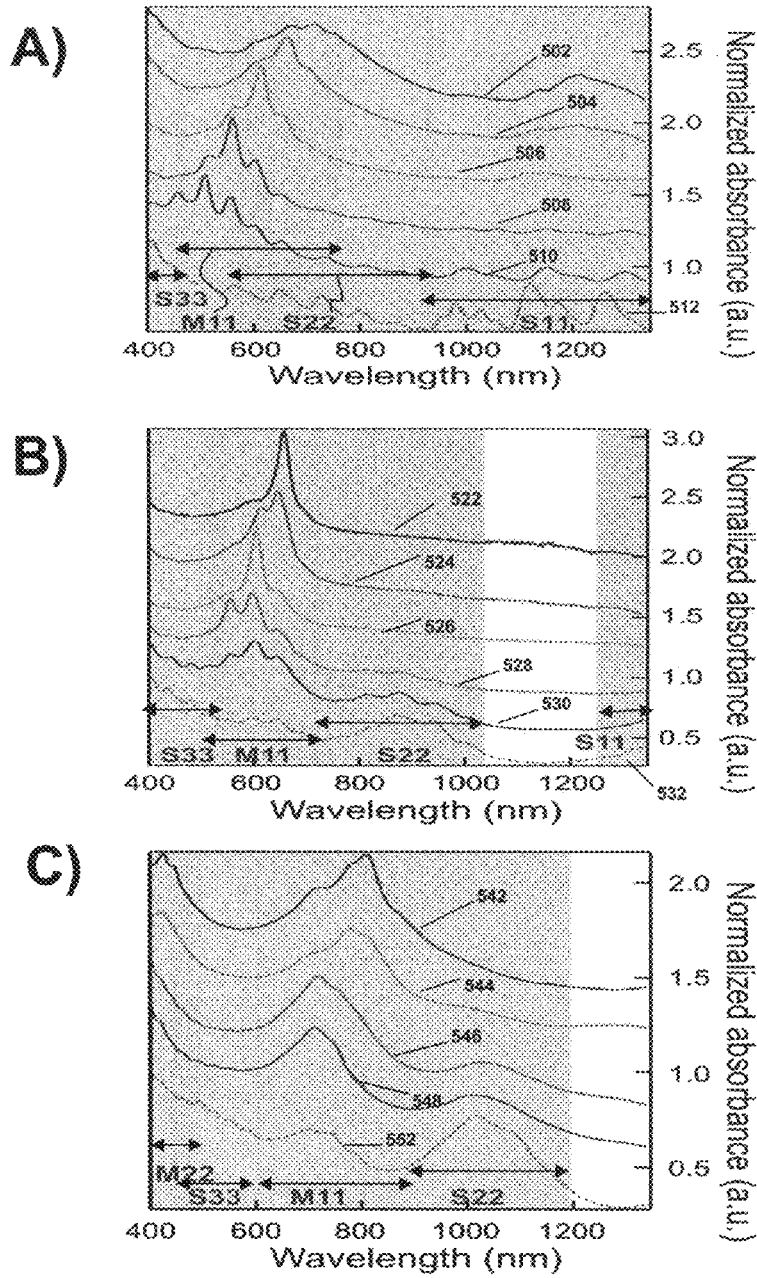
FIGS. 5A-C provide optical absorbance spectra of selected sorted buoyant fractions shown in FIGS. 4A-C, respectively. Curves are offset for clarity.

For the separation of HiPco SWNTs, the surfactant loading was set to about 1.5% (w/v) to isolate metallic nanotubes with diameters centered about 1.0 nm (FIG. 4A). The optical absorbance spectra of the bands (bands 402 (yellow), 404 (green), 406 (blue), 408 (purple), and 410 (magenta)) removed from this gradient provides clear evidence of sorting by diameter and electronic type (FIG. 5A). When compared to the starting HiPco material (curve 512), the sorted metallic SWNTs (curves 502, 504, 506, 508, 510) show strong suppression of transitions beyond 600 nm associated with semiconducting SWNTs (e.g., S11 and S22 transitions) and the enhancement of those from 400 nm to 700 nm arising from metallic SWNTs (M11 transition). Furthermore, the isolation of metallic SWNTs with diameters ranging from about 0.7 nm to about 1.3 nm is evidenced by the shifts in their first-order optical transitions from about 450 nm to about 680 nm.

DGU of laser-ablation-grown and arc discharge-produced SWNTs at surfactant loadings of about 1.25% and about 1.0%, respectively, result in metal sorting optimized for about 1.2 nm and about 1.5 nm diameters, respectively. Referring to FIG. 4B, distinct colored bands (bands 422 (cyan), 424 (clear), 426 (cyan), 428 (cyan), and 430 (magenta)) were observed after centrifugation of the laser-ablation-grown SWNTs. Referring to FIG. 4C, distinct colored bands (bands 422 (green), 444 (brown), 446 (green), and 448 (brown)) were observed for the arc discharge-produced SWNTs. As with HiPco material, separation by electronic type and diameter is evidenced by elimination of semiconducting optical transitions in the near infrared and shifting of the first-order metallic transitions between about 550 nm and about 810 nm. Laser-ablation-produced SWNTs provide particularly refined sorting by electronic type and diameter. The top region (band 422) of the density gradient (FIG. 4B) yields material with greater than 98% metallic SWNT content (FIG. 5B). For the arc discharge material, some of the first-order optical transitions (M11) of the metallic SWNTs appear in the near infrared as a result of their large diameters (FIG. 5C). In addition, the second-order optical transitions (M22) of the about 1.5 nm to about 1.7 nm diameter material appear in the visible near 425 nm. Analysis of the optical absorbance spectra for the arc discharge SWNTs indicates that ~7.8% of metallic SWNTs initially inserted into the density gradients are recovered in fractions with greater than about 86% metallic purity.

Figure 6:
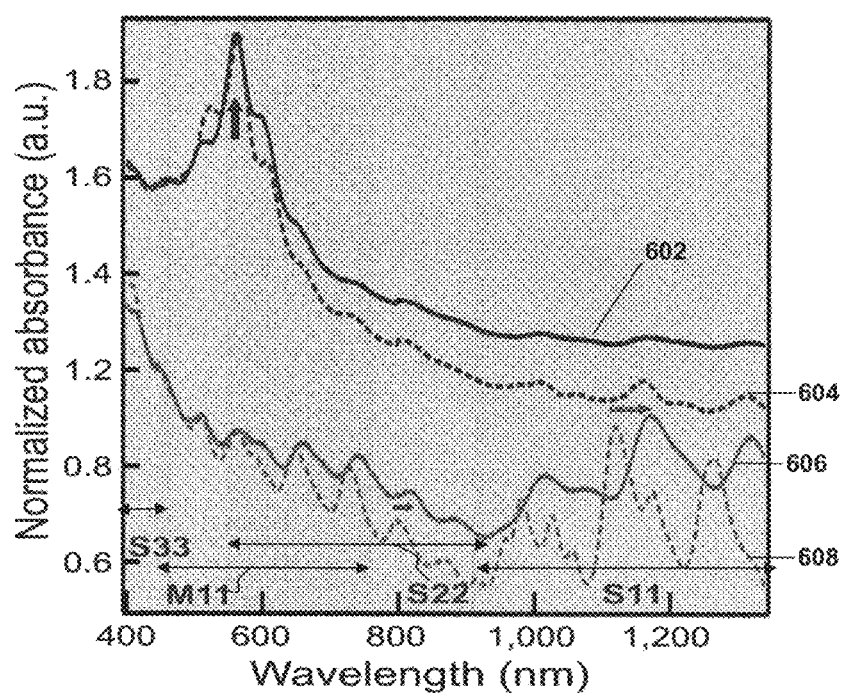
FIG. 6 compares the absorbance of HiPco SWNT transparent conductive films (solid) with that of the SWNT dispersions (dashed) used to produce them. Curves 602 and 604 correspond to 1.0 nm diameter metallic SWNTs. Curves 606 and 608 correspond to unsorted SWNTs. Curves are offset for clarity.

Following optical characterization, the monodisperse metallic SWNT solutions were incorporated into thin films through vacuum filtration and transferred to transparent substrates such as glass, quartz, and polyethylene terephthalate (PET). During filtration, the surfactants encapsulating the SWNTs were removed by rinsing with copious amounts of water. The removal of surfactant can cause the SWNTs to aggregate into bundles as a result of strong inter-nanotutie van der Waals interactions. Comparison of the absorbance of the transparent conductive SWNT films with that of the SWNT dispersions reveals substantial differences between the optical behavior of metallic and semiconducting SWNTs when they are highly bundled in films (FIG. 6). In the transparent conductive SWNT films, the first- and second-order transitions of the semiconducting species (comparing curve 606 with curve 608) red-shift by approximately 40 meV and 30 meV, respectively, and also broaden significantly. In contrast, the transitions associated with the dominant metallic SWNTs (comparing curve 602 with curve 604) undergo a blue-shift of ~10 meV and exhibit relatively limited peak broadening. The reduced sensitivity to bundling for metallic SWNTs has been observed in solution for surfactant encapsulated bundles. Without wishing to be bound by any particular theory, it is believed that this effect can be attributed to the increased charge screening capacity of metallic SWNTs, which can reduce their sensitivity to changes in the external dielectric environment. The ability of metallic SWNTs to retain their optical absorbance characteristics following film formation can be beneficial for transparent conductive coatings as it ensures that films produced from sorted materials will possess definite colors.

Referring back to FIG. 1B, it can be seen that while each of solution A and solution B contains sorted metallic nanotubes, the transmittance minima about 650 nm of solution A (at about 553 nm) is slightly shifted from that of solution B (at about 605 nm). Because these minima occur in the visible spectrum, the resulting films prepared from solution A can be expected to have a different color than films prepared from solution B. Accordingly, an aspect of the present teachings relates to transparent electrical conductors that are transparent (or partially or semi-transparent because of the color tint) and have a visible color. More specifically, by employing metallic carbon nanotubes sorted according to diameter and in turn optical absorbance, electrically conductive films having color tunability properties throughout the visible portion of the spectrum can be prepared. This unique feature is believed to be absent from any currently known materials used to prepare transparent electrical conductors.

Figure 7:
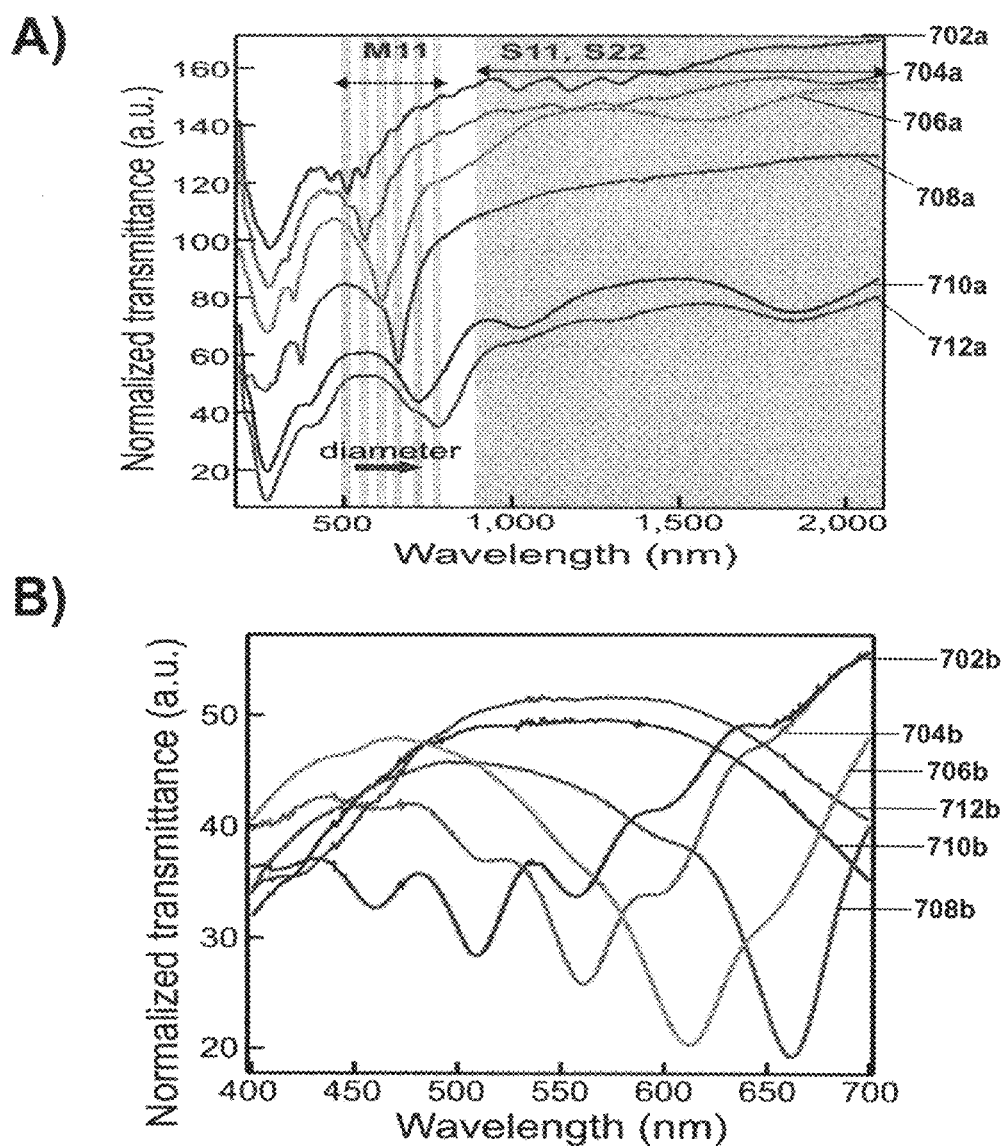
FIG. 7A shows the transmittance of sorted metallic SWNT films normalized to the π-plasmon at approximately 270 nm (curves offset of clarity). The films were produced using SWNTs of the following dominant diameters: 0.9 nm (702), 1.0 nm (704), 1.1 nm (706), 1.3 nm (708), 1.4 nm (710), and 1.6 nm (712).
FIG. 7B shows a magnified plot (same units) of the visible portion of the spectrum for the same SWNT films displaying optical tunability.
FIG. 7C is a photograph showing the corresponding films arranged in order of increasing mean diameter (clockwise starting from lower left).
Figure 7C:
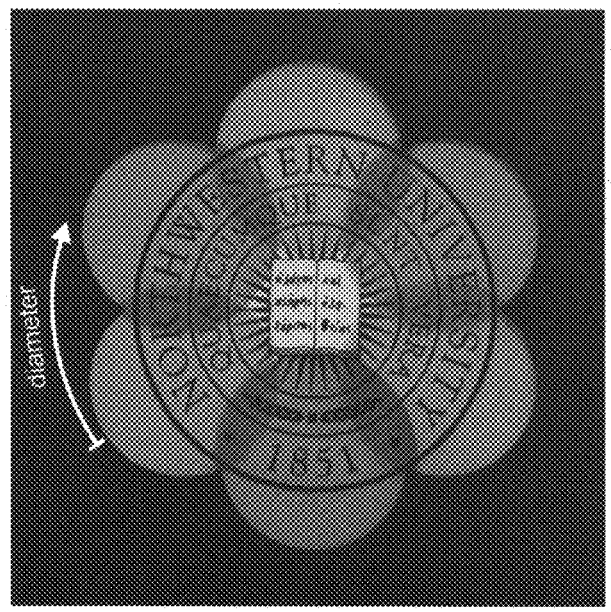

To illustrate this capability, the transmittance spectra of a series of metallic SWNT films with dominant diameters ranging from about 0.9 nm to about 1.6 nm were measured (FIGS. 7A and 7B). For these films, the first-order transitions vary from about 509 nm to about 778 nm, leaving high transmittance windows at wavelengths on either side of the absorption peak. Metallic SWNTs of about 1.4 nm to about 1.6 nm diameter, in particular, appear to be the optimal chiralities for general purpose transparent conduction as their transmittance in the visible peaks around 550 nm, a wavelength range over which the human eye is the most sensitive and solar radiation is the most intense. Given the insensitivity of the metallic nanotubes to bundling, it is possible to combine multiple monodisperse metallic SWNT samples to establish small regions of high transmittance and to effectively fill in the rest of the spectrum with absorbent SWNT chiralities to maximize film conductivity. As shown in FIGS. 7A and 7B, the high transmittance regions that define the colors of the transparent conductors can be tuned through most of the visible spectrum and into the near infrared by control over the metallic SWNT diameters introduced into the film. Accordingly, high transmittance regions of optimized films could be employed to increase the efficiency of devices such as flat panel displays, light emitting diodes, and solar cells. Conversely, the sharply peaked low transmittance regions of the films could be used to filter out unwanted portions of the optical spectrum that compromise device performance. FIG. 7C shows transparent conductive films of six different colors prepared from sorted metallic SWNTs with dominant diameters ranging from about 0.9 nm to about 1.6 nm (arranged clockwise starting from lower left in order of increasing mean diameter).

In addition to improvements in film optical properties and transmittance tunability, enhancements were observed in the conductivity of films generated from material enriched in metallic SWNTs compared to those of similar transparency made from unsorted SWNTs. To ensure valid comparisons, both sorted and unsorted HiPco SWNTs were processed in the same sonication batch and, for several days prior to filtration, all SWNT dispersions were dialyzed into 1% SDS aqueous solutions. Prior to dialysis, large aggregates of SWNTs were removed from the unsorted material by ultracentrifugation at 288,000 g for 32 minutes. By subjecting the SWNTs to identical sonication conditions, it can be ensured that both the sorted and unsorted nanotubes had identical length distributions, because SWNT buoyant density can be insensitive to nanotube length and sonication is known to shorten nanotubes by cutting them. Centrifugation of the unsorted material as well as dialysis of both SWNT classes made certain that the sorted and unsorted nanotubes were in identical surfactant environments prior to film formation, which can affect the degree of bundling inside the film. After processing was complete, three sets of films were generated: one consisting of unsorted SWNTs, and two containing monodisperse metallic SWNTs with dominant diameters of about 0.9 nm and about 1.0 nm, respectively.

Figure 8:
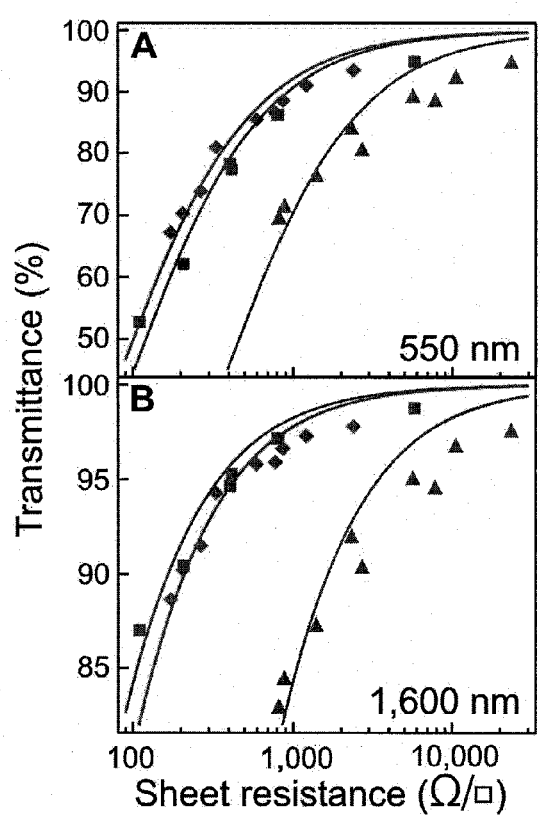
FIG. 8 plots transmittance versus sheet resistance for a series of transparent conductive films generated from HiPco SWNTs at 550 nm (A) and 1600 nm (B) wavelengths. The materials used were metallic SWNTs with principal diameters of 0.9 nm (diamonds), 1.0 nm (squares), and unsorted material (triangles).

Because the transparent conductive SWNT films have thicknesses lower than about 100 nm, which is considerably shorter than optical wavelengths in the visible and infrared, the sheet resistance $R_s$ of these films can be related to their transmittance at a given wavelength with the following equation:

$$T=(1+1/(2R_s)*(\mu_0/\epsilon_0)^{1/2}*\sigma_{op}/\sigma_{dc})^{-2}$$

where $\sigma_{op}$ is the optical conductivity which varies as a function of wavelength, $\sigma_{de}$ is the direct current conductivity, and $\mu_0$ and $\epsilon_0$ are the permeability and permittivity of free space, respectively. Equation 1 was used to fit the measured transmittance data for the transparent conductive films generated from HiPco SWNTs as shown in FIG. 8. The films enriched in metallic SWNTs show clear reductions in sheet resistance compared to unsorted material. The improvement can be quantified by extracting the $\sigma_{op}/\sigma_{dc}$ ratio obtained from the fits. For a series of films generated from a given SWNT material, this ratio determines the relationship between film transmittance and sheet resistance. Because $\sigma_{op}/\sigma_{dc}$ is multiplied by the sheet resistance in Equation 1, reductions in sheet resistance for unsorted and sorted SWNT material at a given transmittance level can be calculated by comparing $\sigma_{op}/\sigma_{dc}$ for the corresponding series of films.

In unsorted HiPco SWNT films, the average over visible wavelengths from about 400 nm to about 700 nm of $\sigma_{op}/\sigma_{dc}$ is 1.1, in agreement with results previously reported in the literature. Conversely, $\sigma_{op}/\sigma_{dc}$ is 0.19 for metallic SWNT films in the visible, thus indicating a conductivity enhancement in excess of 5.6. Accordingly, a film of unsorted HiPco SWNTs will demonstrate a sheet resistance of ~1340 Ω/square at 75% transmittance in the visible compared to a sheet resistance of ~231 Ω/square for a film of sorted metallic HiPco SWNTs of the same transmittance. In the infrared from 800 to 2200 nm, the conductivity improvement exceeds 10 for metallic SWNTs of 1.0 nm diameter and 8.6 for 0.9 nm nanotubes. Without wishing to be bound by any particular theory, the smaller conductivity enhancement for 0.9 nm diameter SWNTs can be attributed to increased semiconducting SWNT content which decreases film transmittance in the infrared.

Figure 9:
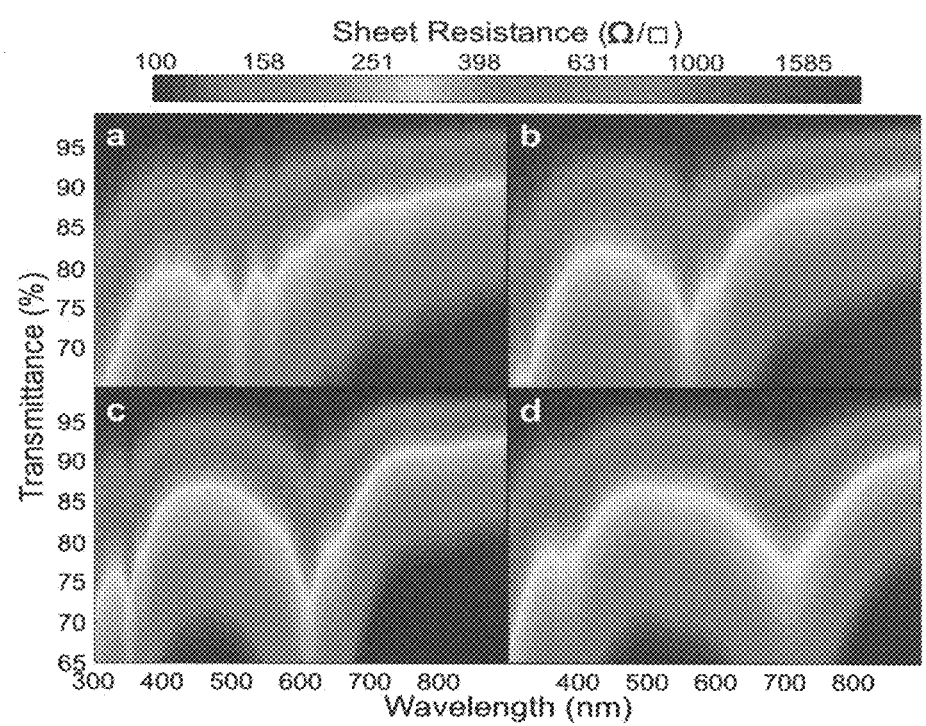
FIG. 9 show sheet resistance-transmittance-wavelength maps of monodisperse SWNT conductive films or coatings. The color maps were generated by fitting Equation 1 over several series of films: (A) 0.9 nm HiPco SWNTs, (B) 1.0 nm SWNTs, (C) 1.1 nm laser-ablation-grown SWNTs, and (D) 1.4 nm arc discharge-produced SWNTs.

The metallic SWNTs of monodisperse diameter generated by DGU, with their enhanced electronic and optical properties, effectively form a library of transparent conductor materials that can be selected and combined to achieve desired performance levels. To illustrate this concept, Equation 1 was applied to transparent conductor data obtained from various metallic SWNT diameters over wavelengths from the ultraviolet to the infrared. The resulting sheet resistance-transmittance-wavelengths maps concisely describe the properties of the metallic SWNT transparent conductors (FIG. 9). For applications requiring a particular transmittance level over a range of wavelengths, the sheet resistances of possible films can be obtained rapidly from these maps, thus easing the selection of optimal metal SWNT diameter.

The maps in FIG. 9 also demonstrate that sorted SWNTs can produce sub-140 Ω/square sheet resistance at transparencies greater than 70% in the visible and the near infrared, which is sufficient for many applications. However, these maps also indicate that overall transparent conductor performance can be related to the starting SWNT material. For both sorted and unsorted nanotubes, laser-ablation-grown SWNTs appear to provide the best performance, followed by arc discharge material, and finally HiPco SWNTs. These differences in transparent conductor performance emphasize that the conductivity of SWNT thin films can be determined by a variety of different factors such as SWNT length and nanotube-nanotube contacts, not simply the proportion of metallic SWNTs. While much effort has been expended to dope SWNTs to improve their conductivity, such doping schemes are generally short-lived as a result of the limited thermal and chemical stability of doped SWNTs. In contrast, transparent conductors formed from intrinsically conductive metallic SWNTs according to the present teachings can indefinitely retain the excellent mechanical, thermal, and chemical properties of pristine carbon nanotubes.

While the efficacy of density gradient ultracentrifugation (DGU) in sorting individually encapsulated SWNTs has been emphasized in the foregoing discussion, an additional benefit of the DGU process of the present teachings is that assemblies of nanotubes bound together by van der Waals interactions also can be isolated according to density. More specifically, in a further aspect of the present teachings, bundles of SWNTs dispersed in solution and selected according to their buoyant density can be employed to enhance the performance of transparent conducting nanotube films.

To illustrate, laser-ablation-grown LA SWNTs (Carbon Nanotechnologies, Inc.) with diameters of about 1.1 nm to about 1.6 nm were sorted in a density gradient with a 2% w/v loading of surfactant and a 3:2 SDS/SC ratio by weight. Following the sorting, bundles of SWNTs with buoyant densities of approximately 1.14-1.16 g/mL were extracted from the centrifuge tube.

Figure 10:
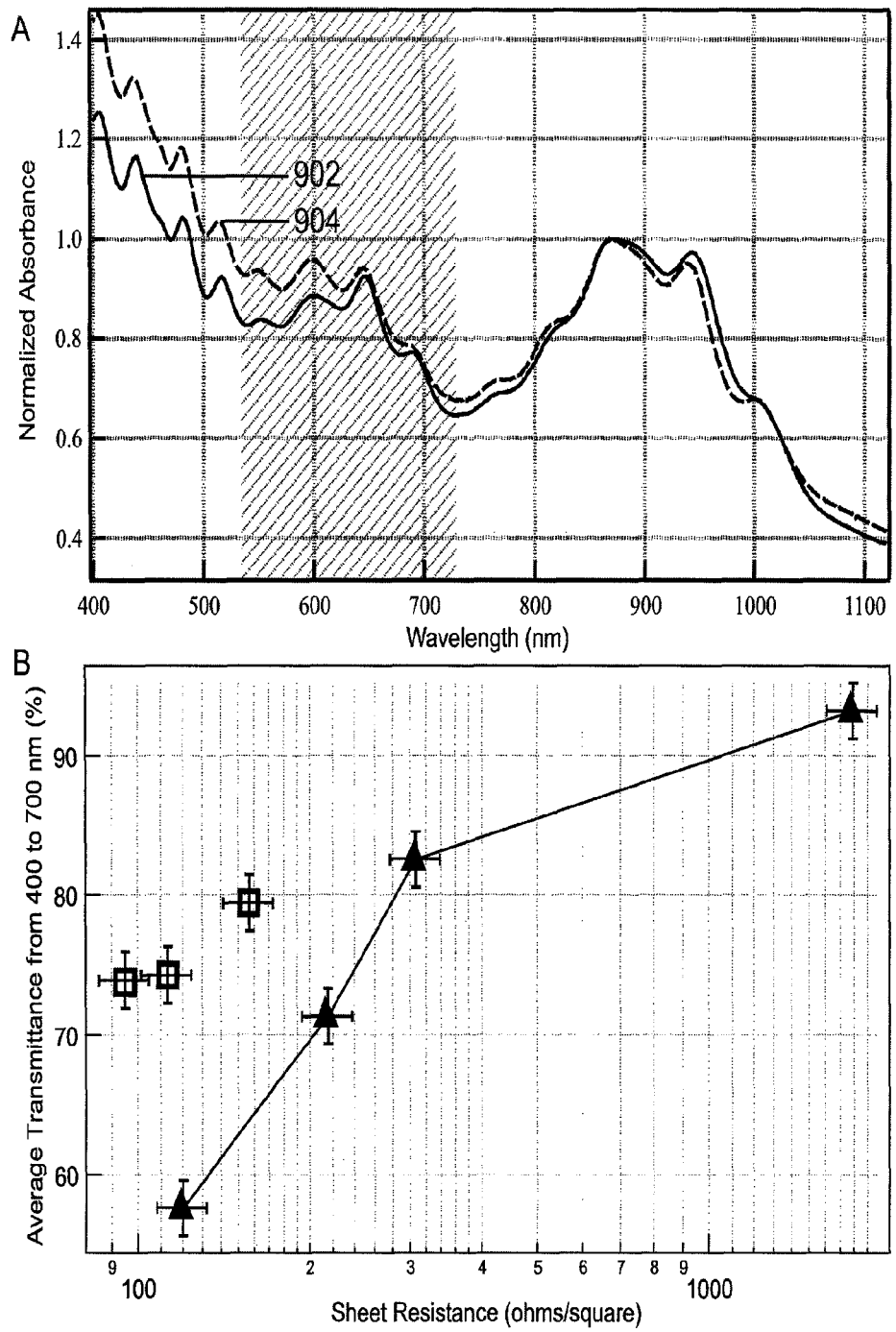
FIGS. 10A-B illustrate the separation of SWNT bundles of optimal shape for transparent conduction.

Optical absorbance measurements (sorted—curve 902, unsorted—curve 904) indicated that these SWNTs maintained the roughly 2:1 ratio of semiconducting to metallic nanotubes of the unsorted material (FIG. 10A). In particular, the shaded wavelength region 910 corresponds to absorption from the metallic SWNTs while unshaded regions are associated with semiconducting SWNT transitions. The spectra indicate that the sorted bundles of SWNTs have roughly the same ratio of semiconducting to metallic SWNTs as the unsorted material. Some reduction in background noise of the spectra also was observed for the material processed through DGU, which reduction is believed to result from the removal of carbonaceous impurities.

Sheet resistance and transmittance measurements of films derived from the sorted bundled material (open squares) revealed a roughly two-fold increase in conductivity at comparable transmissivities over the unsorted (solid triangles) starting material (FIG. 10B). As this improvement cannot be attributed to an increase in the proportion of metallic SWNTs, without wishing to be bound by any particular theory, it is believed that any improvement in conduction was due to more efficient nanotube-nanotube contacts in the films. Solutions containing such sorted bundles also can be used to prepare colored transparent conductive films. Without wishing to be bound by any particular theory, it is believed that the visible color was produced from the removal of absorptive impurities during DGU.

According to a further aspect of the present teachings, individually encapsulated SWNTs can be rebundled through dilution and subsequently used to provide transparent electrical conductors with improved electrical properties. To illustrate, aqueous solutions containing sorted metallic SWNTs with a total surfactant loading of 2% w/v and a 1:2 SDS/SC ratio were diluted by a factor of 20 into a 1 wt % aqueous solution of Triton X-100. As Triton X-100 is a non-ionic surfactant (compared to ionic SDS and SC agents), it cannot rely on charge repulsion to prevent the reaggregation of dispersed SWNTs. Consequently, without wishing to be bound by any particular theory, it is expected that the preponderance of Triton X-100 in the diluted SWNT solution over time will allow the non-ionic agent to displace the ionic surfactants on the SWNT sidewalls and induce formation of SWNT bundles with shapes optimized for transparent conduction.

A series of sorted metal SWNT solutions of the same volume were diluted as described above and left to evolve at room temperature for a given amount of time. After the allotted time had passed, the solutions were used to fabricate transparent conductive films, whose transmittance and sheet resistance were subsequently measured. The sheet resistance and the average transmittance over the visible spectrum of these films for different dilution periods are presented in Table I below.

TABLE I

Effect of Dilution on Sheet Resistance as a Function of Time

| Dilution Time (hours) | Sheet Resistance (ohms/square) | Average Transmittance from 400 to 700 nm (%) |
|---|---|---|
| 0 | 1970 | 92.6 |
| 3 | 1200 | 87.9 |
| 6.8 | 987 | 88.4 |
| 17 | 794 | 87.4 |
| 24 | 733 | 88.8 |

As shown in Table I, the rebundling process resulted in a monotonic increase in film conductivity over time, an increase that cannot be explained alone through the small variations in film transmittance. While the data presented above were obtained with a specific combination of surfactants and solvent, without wishing to be bound by any particular theory, it is believed that rebundling through dilution can work with many other combinations of surfactants and also by diluting into different solvents. Such rebundling schemes using dilution should be readily apparent to those knowledgeable in the art.

The following examples are provided to illustrate further and to facilitate the understanding of the present teachings and are not in any way intended to limit the invention.

EXAMPLE 1

SWNT Dispersion Process

In a typical experiment, SWNT powder was mixed with a 1-2% w/v sodium cholate aqueous solution to ensure a 1-2 mg/mL loading of SWNTs. The mixture was then sonicated using a Fisher Scientific Model 500 Sonic Dismembrator. For large volumes of solution (e.g., about 150 mL), sonication was carried out at 40% of the maximum power (400 W) for one hour. For smaller volumes of solution (e.g., less than about 30 mL), the microtip extension of the sonicator was employed and the sonication reduced to 20% of the maximum power for one hour. The vials or beakers of nanotube solution were cooled in an ice bath during sonication to prevent overheating. For example, HiPco SWNT dispersions were prepared by add 145 mg of raw HiPco SWNT powder to 140 mL of 1% sodium cholate aqueous solution inside a stainless steel beaker. The mixture was subjected to horn ultrasonication at 160 W for one hour using a Fisher Scientific Model 500 Sonic Dismembrator with a 13 mm diameter probe. Dispersions of as-synthesized SWNTs from other sources (e.g., laser-ablation (LA) and electric arc discharge (AD) SWNTs) were prepared under similar sonication conditions at a power of 160 W for 40 minutes in a volume of 120 mL.

Following sonication, large SWNT bundles and impurities were removed from the suspension through centrifugation. The solutions were transferred to ~12 mL SW41Ti centrifuge tubes and centrifuged for 32 minutes at 41 krpm in an SW41 Ti rotor (Beckman Coulter) using an Optima L-90K ultracentrifuge (Beckman Coulter). Lastly, the top 7 cm of solution in each centrifuge tube was carefully collected using a Piston Gradient Fractionator system (Biocomp Instruments, Inc., Canada).

EXAMPLE 2

SWNT Solution Concentration Process

Prior to sorting in density gradients, SWNT solutions were optionally concentrated in a step gradient consisting of two layers inside an SW41Ti centrifuge tube. The bottom layer was 2-4 mL of 60% iodixanol with a surfactant loading identical to that of the nanotube solution to be concentrated. The top layer consisted entirely of SWNT solution typically with zero iodixanol content. The solution then was concentrated in an SW41 Ti rotor (Beckman Coulter) using an Optima L-90K ultracentrifuge (Beckman Coulter) by centrifuging at 41 krpm for 12-15 hours. Following centrifugation, the concentrated SWNT solution was collected using a Piston Gradient Fractionator system (Biocomp Instruments, Inc., Canada).

EXAMPLE 3

Sorting by Density Gradient Ultracentrifugation

The density gradients employed to sort SWNTs by diameter, electronic type, and bundle shape had a common structure. The SW41 Ti centrifuge tubes were first primed with a 1.5 mL underlayer with 60% iodixanol content. Next, a 5 mL linear gradient formed was formed above the underlayer using a SG 15 linear gradient maker (Hoefer Inc.). A 0.880 mL volume of SWNT solution of a desired density then was infused directly into the linear gradient using a syringe pump (Harvard Apparatus Model 11). Following SWNT infusion, an overlayer with 0% iodixanol content was added to the top of the linear gradient. Tables II and III detail the surfactant levels and iodixanol content of each of the layers in the density gradient.

TABLE II

SWNT Sorting Density Gradient Layer Parameters

|  | HiPco (a) | AD (a) | LA (a) | HiPco (b) | LA (b) | AD (b) |
|---|---|---|---|---|---|---|
| % w/v surfactant total | 1.5 | 1.0 | 2 | 1.5 | 1.25 | 1.0 |
| SDS:SC | 3:2 | 7:3 | 3:2 | 3:2 | 3:2 | 3:2 |
| Overlayer % iodixanol | 0 | 0 | 0 | 0 | 0 | 0 |
| Top of linear gradient % iodixanol | 15 | 15 | 20 | 15 | 15 | 20 |
| Bottom of linear gradient % iodixanol | 30 | 30 | 35 | 30 | 30 | 35 |
| Underlayer % iodixanol | 60 | 60 | 60 | 60 | 60 | 60 |

TABLE III

SWNT Sorting Nanotube Layer Parameters

|  | HiPco (a) | AD (a) | LA (a) | HiPco (b) | LA (b) | AD (b) |
|---|---|---|---|---|---|---|
| % w/v SDS | 0.90 | 0.60 | 1.20 | 0.90 | 0.75 | 0.60 |
| % w/v SC | 0.77 | 0.83 | 0.80 | 0.60 | 0.65 | 0.83 |
| % iodixanol | 27.5 | 27.5 | 32.5 | 27.5 | 27.5 | 32.5 |

The density gradients then were centrifuged in an SW41 Ti rotor (Beckman Coulter) using an Optima L-90K ultracentrifuge (Beckman Coulter) at 41 krpm for 12 hours. The sorted nanotube material then was removed from the centrifuge tube in 0.5-1.0 mm fractions using a Piston Gradient Fractionator system (Biocomp Instruments, Inc., Canada).

EXAMPLE 4

Film Formation and Transfer to Glass

The nanotube solutions were processed into films using vacuum filtration and transferred to glass and quartz substrates following methods developed by Rinzler et al. See U.S. Patent Application Publication No. 2004/0197546 and Z. Wu et al. (2004), *Science* 305: 1273-1276, each of which is incorporated by reference herein. Briefly, the nanotube solutions were filtered through mixed cellulose ester (MCE) membranes of 50 nm pore size (Millipore) and allowed to set for 10-20 minutes. After this, 15-25 mL of deionized water was used to wash away any residual surfactant in the film.

Prior to film transfer, the glass or quartz substrates were cleaned by rinsing successively in acetone, isopropyl alcohol, and deionized water, and then dried in a stream of nitrogen. Next, the MCE membranes with SWNT films were soaked for approximately 5 seconds in isopropyl alcohol; in some cases, the films were cut into ~6×10 mm pieces prior to soaking. The membranes were then placed nanotube side down on the substrate and pressed firmly into the substrate while being dried with qualitative filter paper. The substrate-MCE-SWNT film assembly was then repeatedly inserted and removed from an acetone bath. After strong SWNT film adhesion to the substrate was confirmed, the MCE was dissolved away in successive solvent baths—three of acetone and one of methanol—for at least 15 minutes each. Following membrane dissolution, the substrate was cleaned by rinsing in acetone, isopropyl alcohol, and deionized water, and then dried in nitrogen.

EXAMPLE 5

SWNT Film and Solution Characterization

Optical characterization was conducted using a Cary 500 spectrophotometer (Varian, Inc.) operating in a two-beam mode in which the illumination source was directed toward both the film/solution of interest and a reference substrate/solution. The absorption of the reference sample was subtracted from that of the sample of interest to ensure that only the optical properties of the sample were measured. A baseline correction was also applied to account for optical path differences in the two beams. For film transmittance measurements, 1-5 mm diameter circular apertures were employed to isolate a desired area of the sample for characterization. Typical scans were run from 250 nm to 3300 nm at a resolution of 1 nm using a 1.00-1.66 seconds integration time depending on the size of the aperture. SWNT solutions were typically measured from 400-1340 nm at 1 nm resolution using a 1.00-1.33 seconds integration time. Reference samples containing similar levels of water, iodixanol, and surfactant to the SWNT solutions were employed for background subtraction. Sheet resistance measurements were conducted by contacting the films directly using the van der Pauw four-point probe method (Biorad Hall System HL5500) or using an inline four-point probe.

EXAMPLE 6

Metallic SWNT Diameter Determination

Diameters of the sorted metallic SWNTs were determined by correlating their optical absorbance to transition energies obtained from resonance Raman spectroscopy (RRS). By applying a linear fit to the RRS data reported in the literature, the diameters of the sorted metallic SWNTs could be calculated to within ~0.1 nm.

EXAMPLE 7

Evaluation of Metallic SWNT Purity

The purity levels of sorted metallic SWNTs were estimated through optical absorbance spectra. The method used relies on the following three assumptions: as produced material contains SWNTs a 1:2 ratio of metallic to semiconducting chiralities; the absorption strength of SWNTs for a given transition depends only on their electronic type, with other factors such as diameter, length, and bundling being negligible; and the absorbance background associated with carbonaceous impurities varies linearly with energy. In the first step of the procedure, the energy ranges in samples of unsorted and sorted material associated almost exclusively with the optical transitions of either metallic or semiconducting SWNTs were defined. After suitable energy ranges have been found, the linear background absorbance can be removed for each set of transitions leaving only absorbance associated with SWNTs. The background corrected spectra can then be used to estimate the metallic purity by integrating with respect to energy over the absorbance associated with each transition. The purity is evaluated by comparing the ratio of the areas under the metallic and semiconducting transitions in sorted material to the same ratio in the unsorted material, which is assumed to possess a 1:2 mixture of metallic to semiconducting species. To get more conservative estimates of metallic purity, the maximum absorbance associated with each of the background corrected transitions can be used instead to evaluate purity (i.e., further assuming that the diameter distributions present in both the unsorted and sorted material are independent of SWNT electronic type).

EXAMPLE 8

Estimation of Metallic SWNT Yield

The yield of metallic SWNTs obtained from DGU was estimated by analyzing the optical absorbance of material used in each step of the sorting process. Following the assumptions delineated in the metallic SWNT purity estimation section, the area under the first-order metallic transitions multiplied by the solution volume was taken to be proportional to the mass of metallic SWNTs in the dispersion.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A colored transparent conductive film comprising:
   an average transmittance of greater than about 75% in the visible spectrum;
   a sheet resistance of less than about $1.0 \times 10^3$ $\Omega$/square; and
   a visible color, the visible color essentially one color selected from colors of the visible spectrum, said selected visible color transmitted;
   wherein the film comprises single-walled carbon nanotubes having a mean diameter with a diameter variance for differential wavelength absorption in the visible spectrum to provide the visible color of the film.

2. The colored transparent conductive film of claim 1, wherein the film consists essentially of metallic single-walled carbon nanotubes.

3. The colored transparent conductive film of claim 1, wherein the single-walled carbon nanotubes have a diameter variance of less than or about ±0.1 nm.

4. The colored transparent conductive film of claim 1, wherein the single-walled carbon nanotubes have a mean diameter selected from about 0.9 nm, about 1.0 nm, about 1.1 nm, about 1.3 nm, about 1.4 nm, and about 1.6 nm.

5. The colored transparent conductive film of claim 1, wherein the visible color is selected from cyan, magenta, yellow, violet, and green.

6. The colored transparent conductive film of claim 1, wherein the single-walled carbon nanotubes are produced by laser ablation, arc discharge, or high-pressure carbon monoxide conversion.

7. The colored transparent conductive film of claim 1, wherein the film has a sheet resistance of less than about 600 $\Omega$/square.

8. The colored transparent conductive film of claim 1, wherein the film has a transmittance of greater than about 80% at 550 nm.

9. The colored transparent conductive film of claim 1, wherein the film has a thickness less than about 100 nm.

10. A colored transparent conductive film comprising single-walled carbon nanotubes, wherein greater than about 50% of the single-walled carbon nanotubes are metallic, the film with an average transmittance of greater than about 75% in the visible spectrum and having a visible color, the visible color essentially one color selected from colors of the visible spectrum, said selected visible color transmitted.

11. The colored transparent conductive film of claim 10, wherein greater than about 80% of the single-walled carbon nanotubes are metallic.

12. The colored transparent conductive film of claim 10, wherein greater than about 95% of the single-walled carbon nanotubes are metallic.

13. The colored transparent conductive film of claim 10, wherein the single-walled carbon nanotubes have a diameter variance of less than or about ±0.1 nm.

14. The colored transparent conductive film of claim 10, wherein the single-walled carbon nanotubes have a mean diameter selected from about 0.9 nm, about 1.0 nm, about 1.1 nm, about 1.3 nm, about 1.4 nm, and about 1.6 nm.

15. A colored transparent conductive film comprising single-walled carbon nanotubes, wherein greater than about 80% of the single-walled carbon nanotubes are metallic, the film having a visible color and a sheet resistance of less than about $1.0 \times 10^3$ Ω/square, the visible color essentially one color selected from colors of the visible spectrum, said selected visible color transmitted.

16. The colored transparent conductive film of claim 15, wherein greater than about 95% of the single-walled carbon nanotubes are metallic.

17. The colored transparent conductive film of claim 15, wherein the single-walled carbon nanotubes have a diameter variance of less than or about ±0.1 nm.

18. The colored transparent conductive film of claim 15, wherein the single-walled carbon nanotubes have a mean diameter selected from about 0.9 nm, about 1.0 nm, about 1.1 nm, about 1.3 nm, about 1.4 nm, and about 1.6 nm.

19. The colored transparent conductive film of claim 15, wherein the film has an average transmittance of greater than about 75% in the visible range.

20. The colored transparent conductive film of claim 19, wherein the transparent conductive film has an average transmittance of greater than about 80% at a wavelength of 550 nm, and a sheet resistance of less than about 600 Ω/square.

* * * * *